(12) United States Patent
Murphy et al.

(10) Patent No.: US 9,087,330 B2
(45) Date of Patent: Jul. 21, 2015

(54) GEOGRAPHY BASED TRANSACTION COST RECOVERY

(75) Inventors: Matthew D. Murphy, Charlotte, NC (US); Scott A. Weigman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 110 days.

(21) Appl. No.: 13/619,015

(22) Filed: Sep. 14, 2012

(65) Prior Publication Data

US 2014/0081779 A1    Mar. 20, 2014

(51) Int. Cl.
  *G06Q 20/00*   (2012.01)
  *G06Q 20/40*   (2012.01)
  *G06Q 20/20*   (2012.01)

(52) U.S. Cl.
  CPC .......... *G06Q 20/401* (2013.01); *G06Q 20/204* (2013.01)

(58) Field of Classification Search
  CPC .............................. G06Q 20/20; G06Q 20/204
  USPC .............................. 705/16, 14.15, 17, 39, 402
  See application file for complete search history.

(56) References Cited

U.S. PATENT DOCUMENTS

| | | | |
|---|---|---|---|
| 3,815,269 A | 6/1974 | Roselli | |
| 5,987,429 A * | 11/1999 | Maritzen et al. | 705/31 |
| 6,012,048 A | 1/2000 | Gustin et al. | |
| 6,105,001 A | 8/2000 | Masi et al. | |
| 6,129,272 A | 10/2000 | Yoshida et al. | |
| 6,328,207 B1 | 12/2001 | Gregoire et al. | |
| 6,626,356 B2 | 9/2003 | Davenport et al. | |
| 6,999,943 B1 | 2/2006 | Johnson et al. | |
| 7,255,200 B1 | 8/2007 | Walter | |
| 7,308,356 B2 | 12/2007 | Melaku et al. | |
| 7,379,920 B2 | 5/2008 | Leung et al. | |
| 7,387,250 B2 | 6/2008 | Muni | |
| 7,447,657 B1 | 11/2008 | Krajewski et al. | |
| 7,668,780 B2 | 2/2010 | Battaglini et al. | |
| 7,882,026 B1 | 2/2011 | Zettner | |
| 7,949,555 B2 | 5/2011 | Young et al. | |
| 8,301,559 B2 | 10/2012 | McElroy et al. | |
| 8,583,549 B1 * | 11/2013 | Mohsenzadeh | 705/39 |
| 2002/0049632 A1 | 4/2002 | Parkinson | |
| 2002/0087462 A1 * | 7/2002 | Seifert et al. | 705/39 |

(Continued)

OTHER PUBLICATIONS

"Credit Card Processing Calculator" (http://www.merchantcouncil.org/merchant-account/review-compare/credit-card-calculator.php), Merchantcouncil.org, Domains By Proxy, LLC (registrant), Scottsdale, Arizona, Aug. 1, 2012.

(Continued)

*Primary Examiner* — Hunter Wilder
(74) *Attorney, Agent, or Firm* — Weiss & Arons LLP; Michael A. Springs, Esq.

(57) ABSTRACT

Methods and apparatus for recovering a transaction cost in connection with a transaction between a customer and a merchant are provided. The transaction cost may be recovered from a selected region within a geographic area. The selected region may be a customer location. The selected region may be a merchant location. The selected region may be any suitable region. The transaction cost may be recovered utilizing central control over network of merchant locations. The transaction cost may be recovered during a selected time. Apparatus may include an application that allows a selection of a time and/or geographic region for recovery of the transaction cost.

14 Claims, 14 Drawing Sheets

(56) References Cited

U.S. PATENT DOCUMENTS

| | | |
|---|---|---|
| 2002/0128967 A1 | 9/2002 | Meyer et al. |
| 2002/0143655 A1 | 10/2002 | Elston et al. |
| 2003/0074316 A1 | 4/2003 | McCallum |
| 2003/0126139 A1 | 7/2003 | Lee et al. |
| 2003/0216969 A1 | 11/2003 | Bauer et al. |
| 2004/0044627 A1 | 3/2004 | Russell et al. |
| 2005/0004839 A1 | 1/2005 | Bakker et al. |
| 2006/0229998 A1 | 10/2006 | Harrison et al. |
| 2007/0124216 A1 | 5/2007 | Lucas |
| 2007/0175984 A1 | 8/2007 | Khandaker et al. |
| 2007/0288372 A1 | 12/2007 | Behar et al. |
| 2007/0294318 A1 | 12/2007 | Arora et al. |
| 2008/0208680 A1 | 8/2008 | Cho |
| 2008/0270275 A1 | 10/2008 | McElroy et al. |
| 2008/0275774 A1 | 11/2008 | Pepe et al. |
| 2008/0294564 A1* | 11/2008 | Seifert et al. ............... 705/39 |
| 2009/0063291 A1 | 3/2009 | Robbins et al. |
| 2009/0108080 A1 | 4/2009 | Meyer et al. |
| 2009/0132312 A1 | 5/2009 | Reinheimer et al. |
| 2009/0222337 A1 | 9/2009 | Sergiades |
| 2010/0153266 A1* | 6/2010 | Plunkett et al. ............. 705/40 |
| 2010/0169170 A1 | 7/2010 | Fordyce, III et al. |
| 2010/0250379 A1 | 9/2010 | Giordano et al. |
| 2010/0280948 A1 | 11/2010 | Cohen |
| 2011/0054992 A1 | 3/2011 | Liberty et al. |
| 2011/0078032 A1 | 3/2011 | Johnson |
| 2011/0125564 A1 | 5/2011 | DeLillio |
| 2011/0137789 A1 | 6/2011 | Kortina et al. |
| 2011/0231314 A1 | 9/2011 | Sears et al. |
| 2011/0302080 A1 | 12/2011 | White et al. |
| 2011/0307359 A1 | 12/2011 | Gude et al. |
| 2012/0029982 A1 | 2/2012 | Andrade |
| 2012/0030045 A1 | 2/2012 | Smith, III |
| 2012/0047007 A1 | 2/2012 | Halsey et al. |
| 2012/0078790 A1 | 3/2012 | Ornce et al. |
| 2012/0158566 A1 | 6/2012 | Fok et al. |
| 2012/0271707 A1 | 10/2012 | Harrison et al. |
| 2013/0054465 A1 | 2/2013 | Sakata et al. |
| 2014/0039999 A1 | 2/2014 | Levene et al. |
| 2014/0195278 A1* | 7/2014 | Denker et al. ............... 705/5 |

OTHER PUBLICATIONS

"Interchange Profit Calculator" (http://www.greensheet.com/legacy/Interchange_Profit_Calculator.xls), The Green Sheet Inc., Santa Rosa, California, Aug. 1, 2012.

Djurdjevic, Nebo, "Commentary: Mobile payments and low value transactions" (http://www.mobilepaymentstoday.com/article/193382/Commentary-Mobile-payments-and-low-value-transactions), Mobilepaymentstoday.com, Networld Media Group (registrant), Louisville, Kentucky, Apr. 20, 2012.

Papadimitriou, Odysseas, "No Credit Cards for Purchases Under $10" (http://www.cardhub.com/edu/10-dollar-credit-card-payments/), Cardhub.com, Evolution Finance, Inc. (registrant), Arlington, Virginia, Sep. 2, 2011.

"Card security code" (http://en.wikipedia.org/wiki/Card_Code_Verification), Wikipedia.org, Wikimedia Foundation, Inc. (registrant), San Francisco, California, Sep. 27, 2012.

United States District Court for the Eastern District of New York, Proposed "Class Settlement Agreement," Document 1588-1, Case No. 05-MD-01720-JG-JO (In Re Payment Card Interchange Fee and Merchant Discount Antitrust Litigation), Jul. 13, 2012, Brooklyn, New York.

"Definition of 'Percentage' by the Free Online Dictionary," TheFreeDictionary.com, Jul. 24, 2013.

"19 Walmart Stores near '22314,'" Walmart.com Jul. 24, 2013.

"Seen at 11: Retailers Ready to Force Consumers to Pay 'Swipe Fee' for Using Plastic," NewYork.cbslocal.com, Jul. 27, 2012.

Meece, Mickey, "Be Aware: Credit Card Purchases May Soon Carry a Surcharge," Forbes.com, Jul. 13, 2012.

\* cited by examiner

TRANSACTION RECORD

| POS ATTRIBUTES $X_{1...J}$ | SURCHARGE ATTRIBUTES $Y_{1...K}$ | SYNOPTIC ATTRIBUTES $Z_{1...L}$ |
|---|---|---|
| 801 | 803 | 805 |

| DATE | TIME STAMP | REGION | MCC | SALE AMOUNT ($) | NO. OF ITEMS | SURCHARGE FRACTION | CREDIT CARD IDENTIFIER |
|---|---|---|---|---|---|---|---|
| JAN. 9, 2012 | 00:12 | 1 | 12345 | 12.75 | 3 | 0.25 | 002 |
| JAN. 9, 2012 | 9:00 | 2 | 12345 | 10,000 | 1,000 | 1 | 003 |
| JAN. 9, 2012 | 11:20 | 3 | 8910 | 100 | 20 | 0.4 | 001 |
| JAN. 9, 2012 | 13:30 | 4 | 131415 | 500 | 5 | 0 | 002 |
| ... | | | | | | | ... |
| JAN. 9, 2012 | 23:15 | 3 | 8910 | 80 | 17 | 0.35 | 001 |

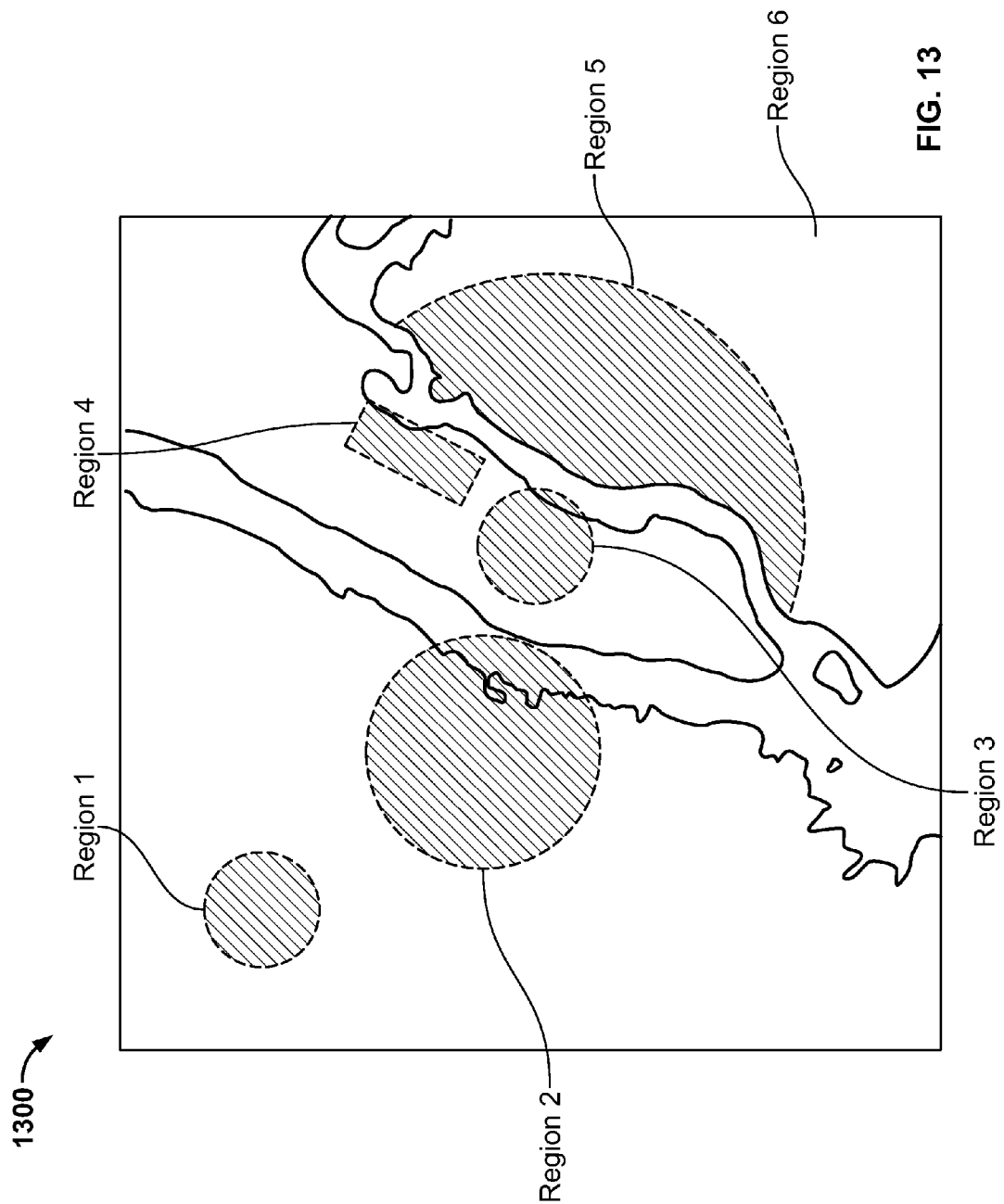

1400

| REGION | SURCHARGE FRACTION | |
|---|---|---|
| 1 | GAME TIME: .9<br>NON-GAME TIME: .2 | 1401 |
| 2 | PEAK TRAVEL TIME: .6<br>OFF- PEAK TRAVEL TIME: .2 | 1403 |
| 3 | .5 | 1405 |
| 4 | .4 | 1407 |
| 5 | .2 | 1409 |

FIG. 14

GEOGRAPHY BASED TRANSACTION COST RECOVERY

FIELD OF TECHNOLOGY

Aspects of the disclosure relate to providing apparatus and methods for recovering a transaction cost in connection with a transaction between two or more transaction participants.

BACKGROUND

In a transaction, a customer (the "customer") may purchase from a merchant or service provider ("the merchant") goods or services ("the product") using credit. The credit may be extended to the customer by an issuing bank (the "issuer"). The merchant presents the transaction to an acquiring bank (the "acquirer"). The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with the settlement.

Settling the transaction may include the transaction network receiving a plurality of transactions from the acquirer. Each of the plurality of transactions may comprise an amount authorized by the issuer. The transaction network may debit an account of the issuer for the amount authorized and credit an account of the acquirer the amount authorized.

Settlement may include a transfer of funds between two or more transaction participants. The transfer may be a "book transfer," an inter-bank transfer or any suitable transfer between the transaction participants. A settlement network may transfer the funds between the transaction participants. Illustrative settlement networks may include the Federal Reserve Wire Network ("Fedwire") and other suitable settlement networks that are well known to those of ordinary skill in the art. The settlement network may be any suitable network linking one or more accounts of the transaction participants.

One transaction participant may impose a fee upon another transaction participant for participating in the transaction. The fee may be referred to as "interchange." Interchange may be a fixed fee for the transaction or a percentage of the transaction. Interchange may be a fixed fee and/or a percentage of the transaction.

Interchange flows from the acquirer, through the transaction processing network, to the issuer. For example, the issuer may transfer to the acquirer a purchase amount of the product, net interchange. The issuer typically uses interchange to cover costs of acquiring credit card customers, servicing credit card accounts, providing incentives to retain customers, mitigating fraud, covering customer credit risk, group compensation and other expenses.

The acquirer may deduct a "transaction cost" from the amount that the acquirer pays the merchant in exchange for the product. The transaction cost may cover the acquirer's transaction processing network fee, interchange, and other expenses. The transaction cost may include a profit for the acquirer.

FIG. 1 shows typical credit card transaction settlement flow 100. Flow 100 involves transaction participants such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price ($100.00) due. The issuer collects the purchase price amount, along with interest and fees if appropriate, from the customer. At step 4, the issuer routes the purchase price amount ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction cost.

At step 6, the acquirer pays an interchange amount ($1.50), via the transaction processing network, to the issuer. At step 7, both the acquirer and the issuer pay a transaction processing network fee ($0.07 for acquirer and $0.05 for the issuer) to the transaction processing network.

TABLE 1

Net positions, by participant, based on settlement flow 100 (shown in FIG. 1).

| Participant | Net ($) |
|---|---|
| Issuer | 1.45 |
| Acquirer | 0.43 |
| Transaction processing network | 0.12 |
| Merchant | −2.00 |
| Customer | 0 |

In settlement 100 (shown in FIG. 1), the transaction fee is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may set interchange rates. Interchange rates often depend for each transaction processing network on merchant type and size, transaction processing method, transaction volume and other factors.

Some transaction processing networks set rules that prohibit merchants from charging a fee ("surcharge") for accepting credit card payments, establishing minimum or maximum purchase price amounts or refusing to accept selected cards.

Nevertheless, the transaction cost may increase the merchant's operating expenses and may result in an increase in prices of the merchant's products.

Recovering some or all of the transaction cost may allow the merchant to receive the full value of a product price.

It would be desirable, therefore, to provide apparatus and methods for recovering a transaction cost associated with a transaction.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 13 shows illustrative information in accordance with the principles of the invention;

FIG. 14 shows illustrative information in accordance with the principles of the invention;

DETAILED DESCRIPTION OF THE INVENTION

Apparatus and methods for recovering a transaction cost are provided. The transaction cost may be a cost associated with a transaction. The transaction may involve an acceptance of a payment instrument by a merchant. The transaction may involve a credit, debit, prepaid, automated clearing house, or any suitable payment method involving the transfer of funds from one participant to another.

The transaction may be a transaction in any state of completion. The transaction may be a prospective transaction. The prospective transaction may include an ability of the merchant to accept the payment instrument as a form of payment for a product. The prospective transaction may include the customer presenting the payment instrument to pay for the product.

The transaction may be a pending transaction. For example, a transaction may be pending prior to receiving authorization from the issuer. The transaction may be pending during a time between receiving the authorization and settlement. The transaction may be pending during a time prior to collection, by the issuer, of the purchase price from the customer.

The transaction may be an executed transaction. Executing the transaction may include a first transaction participant passing the transaction along to a second transaction participant.

The payment instrument may include a credit card and/or other forms of payment instruments. Such other forms of payment instruments may include: a debit card, an instrument or device that includes a contactless chip, such as an ISO14443-compliant contactless chip, a cell phone, a personal data assistant, a transponder or any other suitable electronic purchasing devices. Payment instruments may store data in a magnetic strip, a bar code, a silicon chip or any other suitable data storage device or format. The merchant may provide a POS terminal that is configured to receive data from, provide data to, or exchange data with the payment instrument.

The payment instrument may be presented to the merchant by the customer as payment for the product. The transaction cost may be associated with acceptance, by the merchant, of the payment instrument as a form of payment. The transaction cost may be an acceptance cost associated with the payment instrument.

The transaction cost may include a fee a merchant pays to accept a payment instrument as form of payment for a product. The transaction cost may include the interchange fee. The transaction cost may include the network fee.

The transaction cost may be associated with a transaction service. Illustrative transaction services are listed in Table 2.

TABLE 2

| Illustrative transaction services. |
| Illustrative Transaction Service |
| --- |
| Sale of goods to customer |
| Authorization of customer credit |
| Clearance of customer credit |
| Notice of customer balance |
| Invoice of customer for bank service |
| Invoice of network fee |
| Invoice of interchange fee |
| Matching of acquirer and issuer |
| Acquisition of goods |

Figure 1:
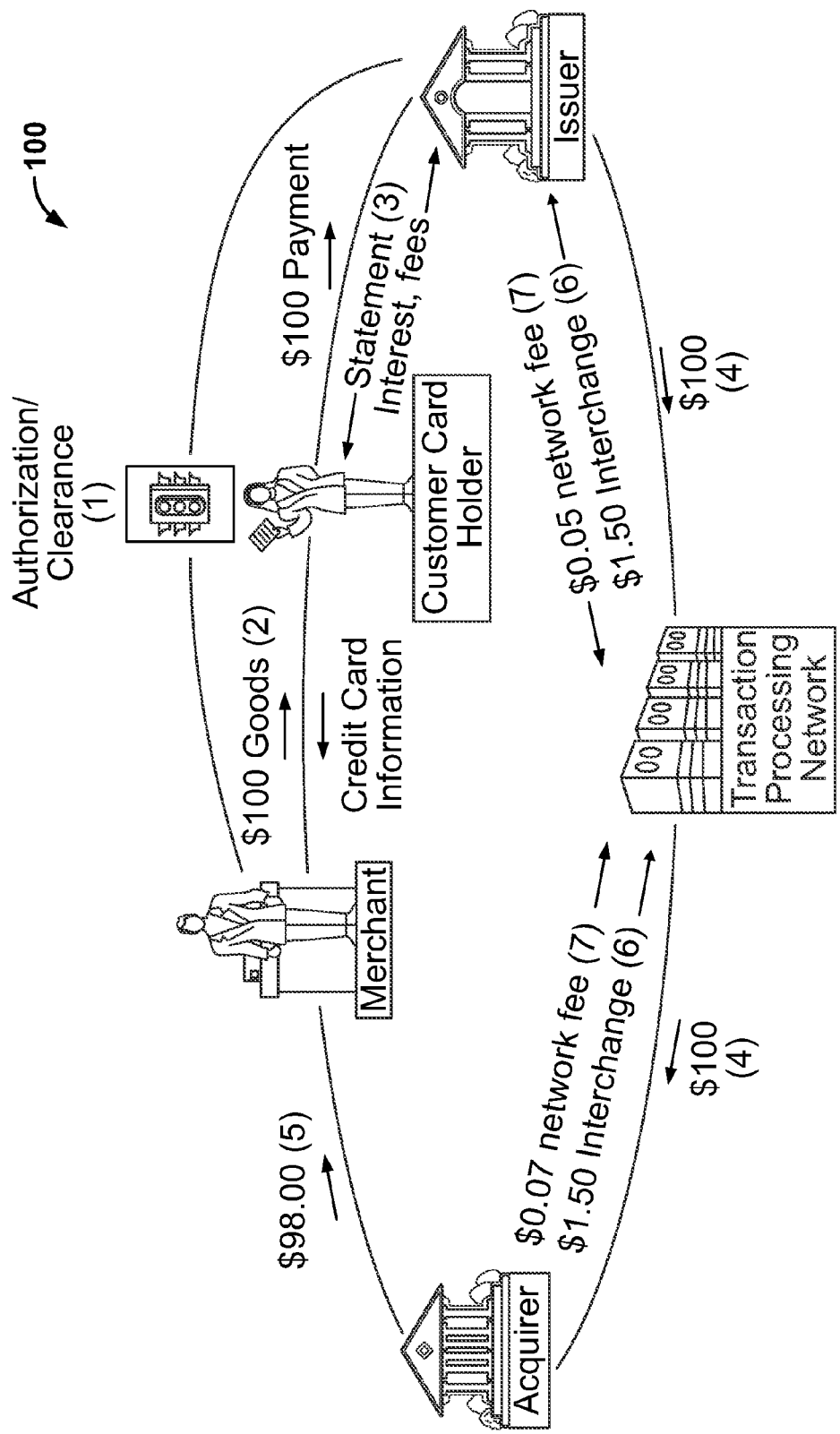
FIG. 1 shows a prior art scenario.

Each transaction service may be performed by a transaction participant. In some circumstances, a participant may perform more than one of the services. Each participant may charge a fee for providing the service. The fee may be charged to one or more of the other participants (as shown in FIG. 1). Thus, for each transaction, a participant may be required to pay (or collect), in sum, a "net" fee. A rule may require that the net fee for a designated participant conform to a requirement. The rule may be imposed by a transaction participant.

Table 3 shows illustrative transaction participant types.

TABLE 3

| Illustrative participant types. |
| Illustrative Transaction Participant Types |
| --- |
| Merchant |
| Customer |
| Authorization service provider |
| Clearance service provider |
| Settlement service provider |
| Issuer |
| Network |
| Acquirer |

More than one participant of a given type may be available to participate in the transaction. Different participants of the same type may have advantages and/or disadvantages relative to the other participants of that type. For example, one issuer may be a member of a lending consortium while another is not a member, one transaction processing network may require payment a relatively small interchange fee while another network may require payment of a relatively large interchange fee, and the like.

The transaction cost may include the fee for providing a transaction service. The transaction cost may include the fee assessed by one transaction participant to another transaction participant in connection with the transaction between the merchant and the customer.

The methods may include recovering the transaction cost. Recovering the transaction cost may include offsetting the transaction cost. Offsetting the transaction cost may include imposing the surcharge prior to incurring the transaction cost. The offset may be a recovery amount.

The transaction cost may be recovered from the customer. The transaction cost may be recovered from any suitable transaction participant. The transaction cost may be recovered from a party that is not a transaction precipitant.

Recovering the transaction cost may include imposing the surcharge on the customer that pays for the product using the payment instrument. The surcharge may offset a portion of the transaction cost. For example, accepting the payment instrument as payment may result in the merchant incurring the transaction cost. The transaction cost may correspond to the merchant discount. The merchant may recover the transaction cost by imposing the surcharge on the customer or any suitable transaction participant. The surcharge may be less than the transaction cost. The surcharge may be more than the transaction cost. The surcharge may be equal to the transaction cost.

The surcharge may include a fixed amount. The surcharge may include a proportional amount. The surcharge may include a combination of a fixed amount and a proportional amount. The proportional amount may be defined based on a portion, such as a percentage, of a purchase amount. The surcharge may be based on a brand or class of credit card. For example, the merchant may impose a surcharge on a particular class of credit cards. Exemplary classes may include credit cards associated with a reward program, a "signature card" or credit cards associated with an annual fee.

The surcharge may be based on an identity of the transaction network that receives the authorization request. For example, the merchant may surcharge cards that are associated with a first network a first amount and cards that are associated with a second network a second amount.

The surcharge may be imposed based on a channel of commerce associated with the transaction. For example, the merchant may surcharge "card not present" transactions. The merchant may not surcharge credit card transactions initiated at a "brick and mortar" location. Illustrative channels of commerce may include an online portal, a "brick and mortar" location, a mobile device application, a catalog, telemarketing, television advertisement or any suitable channel of commerce.

The surcharge may include a penalty for using a particular payment instrument. The surcharge may include a reward for using a particular form of payment. The surcharge may be structured as an amount added to a price of the product. The surcharge may be structured as a discount to customers that use non-credit card forms of payment. The surcharge may be structured as a rebate to customers that use non-credit card forms of payment.

The surcharge may be applied according to a schedule. For example, the merchant may impose a surcharge schedule. The surcharge schedule may impose the surcharge at a designated time. The schedule may include defining a price of a product if payment is made by credit card. The schedule may include a discount or rebate if payment is made using a debit card or check. The debit card or check may be associated with a lower transaction cost than the credit card. By offering the rebate or discount, the merchant may seek to incentivize the customer to use the debit card or check as payment. The merchant may derive the "credit card price" based on adding the surcharge to a profit margin of the product. The rebate or discount may deduct the surcharge from the "credit card price."

The surcharge may correspond to a fractional portion of the transaction cost. The fractional portion may be a product of a surcharge fraction ("SF") and the transaction cost. SF may be defined by $0 \leq SF \leq 1$. For example, if the SF is 0.3, the fractional portion may be approximately ⅓ of the transaction cost. The SF may be determined based on a performance metric. The SF may be associated with the value.

The fractional portion may be one. When the fractional portion is one, the surcharge may correspond to the entire transaction cost. The fractional portion may be zero. A fractional portion of zero may correspond to no imposition of a surcharge. When the fractional portion is one, the customer may bear the transaction cost. When the fractional portion is zero, the merchant may bear the transaction cost. When the fractional portion is in between zero and one, the transaction cost may be shared by the merchant and customer.

The methods may include receiving a value. The value may be associated with an attribute of the transaction. The value may correspond to the attribute of the transaction.

For example, the value may correspond to a location of the merchant. The value may correspond to a location of the customer. The value may correspond to a time of purchase. The value may correspond to a type of payment instrument. The value may correspond to a mobile device of the customer. The value may correspond to a price of the product. The value may be any suitable value. Table 4 shows illustrative transaction attributes and associated values.

TABLE 4

Illustrative transaction attributes and associated values.

| Illustrative Transaction Attributes | Illustrative Associated Value |
| --- | --- |
| Geographic | Longitude/latitude |
|  | GPS coordinates |
|  | Map coordinates |
|  | Elevation |
|  | Depth |
|  | Distance from a point |
|  | Address |
|  | Zip code |
|  | Area code |
|  | County |
|  | State |
|  | Country |
|  | IP address |
|  | Signal triangulation |
| Temporal | Seconds |
|  | Minutes |
|  | Hours |
|  | Day |
|  | Week |
|  | Month |
|  | Year |
|  | Duration |
| Transaction amount | Dollars |
|  | Available credit |
|  | Currency |
|  | Foreign exchange rate |
| Number of items purchased | Number |
|  | Number of distinct stock keeping units ("SKU") |
| Merchant category code | Numerical identifier |
|  | Taxation status |
|  | Associated acquirer |

TABLE 4-continued

Illustrative transaction attributes and associated values.

| Illustrative Transaction Attributes | Illustrative Associated Value |
| --- | --- |
| Surcharge | Amount |
| | Surcharge fraction |
| | Maximum surcharge |
| | Minimum surcharge |
| | Percentage of purchase |
| | Fixed amount |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |

The methods may include receiving a performance metric. The performance metric may be associated with the value. The value may be associated with the performance metric. The performance metric may be associated with an attribute of the transaction. When the value includes a plurality of values, the performance metric may be associated with the plurality of values.

A change in the performance metric may correspond to an effect of recovering the transaction cost. The change in the performance metric may correspond to an effect of imposing the surcharge.

The effect may be an effect on one or more of the transaction participants. The effect may be an effect any suitable party.

The effect may be an effect on the merchant. The effect on the merchant may be an effect on a profitability of the merchant. The effect on the merchant may include a change in transaction volume, revenue, gross/net profit, number of items sold or any suitable indicator of profitability.

For example, the merchant may impose the surcharge on customers that use a branded credit card to pay for a purchase. Following a "roll out" of the surcharge, the merchant may monitor transaction volume associated with proposed or executed transactions that include the value corresponding to a time period, such as a "holiday shopping season." The transaction volume may be the performance metric. A duration of the "holiday shopping season" may be the value associated with the performance metric.

The merchant may monitor how often a product is purchased using the branded credit card during the holiday shopping season. Data collected by the merchant may statistically indicate the effect of the surcharge on the transaction volume during the holiday shopping season.

As a further example, the value may correspond to a geographic marker. The merchant may monitor transaction volume associated with a specific geographic region. The merchant may monitor how often a product is purchased using a particular payment instrument within a particular zip code. The merchant may monitor how often a product is purchased, using the payment instrument, through an online portal of the merchant. The merchant may monitor how often a product is purchased, using the payment instrument, at a retail location of the merchant. Data collected by the merchant may statistically indicate that the effect of the surcharge on a sale of the product within the geographic region.

The effect may be an effect on the customer. For example, the merchant may impose a surcharge across multiple brands of payment instruments accepted by the merchant. The merchant may detect that a class of customers continues to make purchases using surcharged payment instruments. The merchant may detect that a class of customer has reduced a number of purchases made using surcharged payment instruments. The class of customer may be defined by any suitable characteristic associated with a customer. The effect may correspond to an impact on the merchant of a change in customer behavior.

As a further example, the effect may include a change in a purchasing behavior of the customer. If a surcharge is imposed on credit transactions, the customer may avoid using a credit card to pay for the product. For example, if the surcharge is imposed at a merchant location associated with a merchant category code ("MCC"), the customer may avoid making a purchase at the merchant location associated with the MCC. The customer may increase use of payment instruments that are not associated with the surcharge or are associated with a lower surcharge.

The performance metric may correspond to a ratio of "surcharged" payment instruments to "non-surcharged" payment instruments. For example, the merchant may surcharge credit card purchases and may not surcharge other forms of payment. Following a "roll out" of a surcharge schedule, the merchant may monitor a number of surcharged purchases and a number of non-surcharged purchases.

The performance metric may be any suitable performance metric. Table 5 lists illustrative performance metrics.

TABLE 5

Illustrative performance metrics.
Illustrative Performance Metrics

Transaction volume (number)
Transaction volume ($)
Transaction frequency (per item)
Transaction frequency (per sale)
Total sales
Sales per fiscal period
Number of credit card purchases
Number of non-credit card purchases
Number of items purchased
Cost/price per item purchased
Same store sales
Customer characteristics The performance metric may be affected by a change in the surcharge. The change in the surcharge may correspond to a change in the performance metric. The change in the performance metric may be detected by comparing a first performance metric quantity to a second performance metric quantity. The first performance metric quantity may be associated with a first surcharge. The second performance metric quantity may be associated with a second surcharge.

An exemplary performance metric quantity may be a number corresponding to a volume of sales on the first Tuesday of a month or a number corresponding to net profit during the thirty-third week of a year.

The first and second surcharges may differ in amount, time, location, MCC, surcharge fraction or any suitable surcharge attribute. The first and second surcharges may differ as a result of a transaction attribute associated with each surcharge.

The methods may include receiving a plurality of performance metric quantities. Each of the plurality of performance metric quantities may correspond to an effect of a plurality of surcharges on the performance metric.

The methods may include receiving a performance metric threshold. The threshold may be associated with a target level of the performance metric. The threshold may correspond to a performance metric quantity. For example, the threshold may correspond to a minimum transaction volume or minimum transaction frequency conducted by a merchant. The threshold may be associated with the effect of imposing the surcharge. The threshold may be selected based on the effect of imposing the surcharge.

The threshold may be associated with a plurality of performance metrics. For example, the threshold may correspond to a minimum transaction volume and a minimum net profit over a particular time period.

The methods may include adjusting the surcharge. The adjusting of the surcharge may affect the performance metric. The effect on the performance metric may be measured. The methods may include measuring an effect of the surcharge on the performance metric. The effect may be measured by detecting a change in a performance metric quantity.

The methods may include determining a plurality of performance metric quantities based on the effect of the surcharge on the performance metric. The methods may include receiving the plurality of performance metric quantities.

The methods may include deriving a surcharge sensitivity. The surcharge sensitivity may be derived from the performance metric. The surcharge sensitivity may be derived from the performance metric quantities. For example, an acquirer may obtain transaction receipts from a plurality of merchants within a merchant category code ("MCC"). The MCC may group merchants that proffer similar or related products. The transaction receipts may correspond to credit card transactions processed by the merchant.

Each merchant included in the MCC may impose a surcharge schedule. Each surcharge schedule may be different. Each merchant may be located in a distinct geographic location. The acquirer may wish to gauge how imposition of the surcharge may affect sales at one or more merchants included in the MCC. Based on historical transaction data associated with the MCC, the surcharge sensitivity may be derived. The surcharge sensitivity may that captures a sensitivity of sales volume to an imposition of the surcharge.

The sensitivity may be derived from historical transaction data by correlating a transaction attribute to the performance metric. The transaction attribute may include the surcharge, store location, temporal element or any suitable attribute of the transaction.

The sensitivity may be a slope or a suitable suite of constants through which the performance metric is correlated to the surcharge. The correlation between the performance metric and the surcharge may be established using any suitable technique. For example, the performance metric may be linearly, or non-linearly, regressed upon the surcharge, modeled on the surcharge, predicted from the surcharge or estimated from the surcharge. The correlation may be established utilizing a multivariate statistical model or a neural network.

Based on the sensitivity, a merchant may be advised that a surcharge of Y may generate more revenue than revenue lost as a result of customers declining to use a credit card subject to the surcharge. Based on the sensitivity, the merchant may be advised that an increase of Z in the surcharge may negatively affect overall sales.

The sensitivity may be determined for a geographic location. For example, the merchant may be informed of a sensitivity associated with the geographic location. The geographic location may correspond to a store location.

The sensitivity may be associated with the value. The value may correspond to a temporal value. For example, the sensitivity may indicate that during a time of day, such as "rush hour," customers are less sensitive to an imposition of the surcharge.

The methods may include identifying, a surcharge that corresponds to a selection of the performance metric quantities. Each of the selected performance metric quantities may be not less than the performance metric threshold. The identifying may be based on one or more transaction attributes. For example, a surcharge may be identified that reduces a merchant's transaction cost by 20% and maintains net profit above $5 million dollars per month within a geographic region.

The identifying may be based on the surcharge sensitivity. For example, the issuer may detect that for a given surcharge imposed on credit card transactions, credit card sales processed by the merchant during a fiscal period typically remain above a threshold dollar value. The surcharge sensitivity may indicate that a decrease in the surcharge may not increase sales volume above a threshold dollar value.

The methods may include transmitting an authorization request to charge an account associated with the payment instrument. The charge may correspond to an amount that is not less than a sum of the surcharge and a price of the product. The price of the product may correspond to a cost of the product.

The methods may include associating the value with the transaction. The value may correspond to a transaction attribute. The methods may include comparing the value to a criterion. The methods may include determining whether the value satisfies a criterion. The criterion may have one or more features in common with the value. If the value satisfies the criterion, the methods may include transmitting the authorization request to charge the account associated with the payment instrument. The charge may correspond to a first amount that is not less than a sum of a second amount and the surcharge. The second amount may correspond to a price of the product. The surcharge may offset a cost to the merchant of accepting the payment instrument as payment.

For example, the value may correspond to a geographic location, such as a distance from a sports stadium. The criterion may correspond to a radius from an address of the sports stadium. If the value is within the radius, a surcharge may be imposed on a transaction that occurs at the geographic location.

If the value does not satisfy the criterion, the methods may include transmitting an authorization request to charge the account not less than the second amount. If the value does not satisfy the criterion, the merchant may chose not to offset the transaction cost.

In some embodiments, if the value satisfies the criterion, the surcharge may not be imposed. In some embodiments, if the value does not satisfy the criterion, the surcharge may be imposed.

The authorization request may be transmitted to the transaction network. The authorization request may be transmitted to the issuer. The transaction network or issuer may transmit an approval to the merchant to charge the account of the customer. The charge may correspond to the first amount. The charge may correspond to the second amount.

The criterion may be selected based on the performance metric, the performance metric quantities, performance metric threshold, surcharge sensitivity, or any suitable effect of imposing the surcharge. The criterion may correspond to a transaction attribute.

The criterion may correspond to the performance metric quantity. For example, the value may correspond to a sales volume during a month. The criterion may correspond to a target sales volume for the month. If the value satisfies the criterion, sales for the month have reached the target sales volume and the surcharge may be applied for a remainder of the month.

The criterion may include a temporal criterion. The temporal criterion may include a start time and an end time. The start time may be a time on a surcharge schedule at which the merchant begins to impose the surcharge. The end time may be a time on the surcharge schedule at which the merchant ceases to impose the surcharge. The methods may include determining if the value is within a range defined by the start time and the end time. If the value is within the range, the value may satisfy the criterion. The start time may be one of a plurality of start times. The end time maybe one of a plurality of end times.

For example, the merchant may "turn on" a surcharge during morning hours, "turn off" the surcharge during afternoon hours and "turn on" the surcharge during evening hours. The surcharge schedule for turning on or off the surcharge may be based on the performance metric, performance metric quantities or the performance metric threshold.

The temporal criterion may include a time period. The time period may have any suitable length, such as one hour, one day, seven days, two weeks, thirty days, one-month, three months, six months, one year, two years, five years or any other suitable length.

The temporal criterion may correspond to a time associated with an event. The event may be a sporting event, an entertainment event, an academic event or any suitable event. The criterion may correspond to a time relative to an event time. The event time may correspond to a duration of the event.

The temporal criterion may include a duration or location of an ongoing news event. For example, the surcharge may be imposed upon detection of the news event. The news event may include a filming of a motion picture, a marathon, police activity or a weather related event.

The surcharge may be lifted after conclusion of the news event.

The news event may correspond to a synoptic attribute of the transaction. Exemplary synoptic attribute may include weather at the time of the transaction, political party in power at the time of the transaction, a surcharge sensitivity at the transaction location.

The event time may include a first period of time prior to a start of an event. The event time may include a second period of time following a conclusion of the event. The temporal criterion may include an observed holiday. The observed holiday may be a legal, religious or any suitable holiday.

The criterion may be associated with the surcharge. For example, the merchant may implement a transaction cost recovery program that imposes the surcharge on customers that shop at a particular retail location during a particular time. If the value corresponds to the retail location and the particular time, the surcharge may be imposed on the customer's transaction.

As a further example, the merchant may impose the surcharge on customers based on a credit rating assigned by a credit rating agency. The credit rating may be assigned to the acquirer. If the value satisfies the credit rating the surcharge may not be imposed.

As a further example, the merchant may impose a surcharge based on a customer characteristic. Exemplary characteristics may include customer loyalty membership, cumulative purchase amounts, rewards balance, average number of items purchased, or number of customer visits associated with a purchase.

The criterion may be a geographic criterion. For example, the criterion may correspond to a radius from a sports stadium.

As further example, the criterion may correspond to a billing address associated with the payment instrument. The performance metric may indicate that customers associated with a first billing zip code are less sensitive to the surcharge than customers associated with a second billing zip code. The customers associated with the second zip code may be more likely to abstain from making a purchase that will require payment of the surcharge. Customers associated with the second zip code may be more sensitive to the surcharge. Customers associated with the first zip code may be less sensitive to the surcharge.

If the value corresponds to a zip code, the surcharge may be imposed if the value zip code satisfies the criterion zip code.

The geographic criterion may include a roadway. For example, it may be determined that the surcharge imposed at service station alongside a stretch of highway does not significantly impact overall sales at the service station. The merchant may decide to impose the surcharge on purchases made at the service station to recover the transaction cost associated with the purchases. From a central location, the merchant may identify transactions that include the value corresponding to service stations alongside the stretch of highway. If the transaction includes the value, the surcharge may be imposed on the transaction.

The geographic criterion may include an address. The geographic criterion may correspond to a radius extending away from an address. For example, the surcharge may be imposed at a retail location. If following imposition of the surcharge, the performance metric indicates that sales at the retail location are sluggish, the merchant may offer "surcharge free" transactions at the location. The "surcharge free" transactions may be offered at the retail location for a period of time.

The geographic criterion may include a region. The region may correspond to a state. The region may include a group of states. Based on the geographic criterion, from a central location, the surcharge may be imposed on residents of a particular state. Based on the geographic criterion, the surcharge may not be imposed on residents of a particular state. The criterion may be based on regulations or laws of the particular state. For example, a state may have a law that forbids imposition of the surcharge on credit card transactions. The merchant may control imposition of the surcharge from a central location based on comparing the geographic value associated with the transaction to the geographic criterion.

For example, a franchisor or a merchant with a network of stores across state lines may control imposition of a surcharge from a central point. The surcharge may be imposed based on a location of a store or franchise. The surcharge may be imposed from the central point in a manner that conforms to laws of multiple states. For example, no surcharge may be imposed on transactions that originate in some states. For transaction originating in some states, a specific surcharge fraction may be used to determine the recovery amount. In some states, a maximum surcharge allowable under laws of the states may be imposed.

The region may correspond to a county. The region may correspond to a municipality. The region may include an area defined by a zip code. The region may include a group of areas defined by zip codes.

The geographic criterion may be associated with the surcharge. The surcharge may be associated with the geographic criterion.

For example, a merchant may run a promotion for residents of a town or county. The promotion may include "surcharge free" transactions at any merchant location for residents of the town or county. A resident may be defined as a customer associated with a billing address in the town or county.

The geographic criterion may include a map coordinate. The map coordinate may be one of a plurality of map coordinates defining a region. The map coordinates may be received from a graphical user interface ("GUI").

For example, using the GUI, a user may select a region. The user may be a transaction participant. Using the GUI, the user may view one or more performance metrics or other suitable information associated with the selected region.

For example, the user may view the surcharge sensitivity in selected region. The user may view a ration of a recovery amount to transaction volume in the selected region. The GUI may present to the user an optimized surcharge that balances transaction cost recovery and overall revenue. The GUI may display to the user surcharge sensitivity levels in the selected region.

The GUI may be used to select the temporal criterion. The GUI may provide an interface for creating a surcharge schedule that fluctuates with time. The GUI may display to the user the effect of the surcharge schedule in the selected region. The GUI may be used to schedule the surcharge across a plurality of regions.

The GUI may be configured for presentation and interaction on a mobile device. The GUI may respond to a touch screen capability of the mobile device.

Apparatus may include an article of manufacture comprising a computer usable medium having computer readable program code ("code") embodied therein. The article may be configured to recover the acceptance cost associated with the payment instrument. The code may cause a computer to receive the plurality of performance metric quantities. The plurality of performance metric quantities may be associated with the value. The value may be a geographical value. The value may be a temporal value.

For example, a rate of sales-per-hour may be measured for one or more merchant locations within a zip code. The rate of sales-per-hour for each hour during a day may correspond to the plurality of performance metric quantities. The plurality of performance metric quantities may be associated with the geographic value, such as the zip code or store address.

The code may cause the computer to receive the performance metric threshold. The code may cause the computer to identify, for the value, the surcharge that corresponds to a set of the performance metric quantities. Each member of the set of the performance metric quantities may be not less than the performance metric threshold. The set may include 0, 1, or more members.

For example, the merchant may implement a surcharge schedule at a location. The surcharge schedule may vary the surcharge at different times. The merchant may monitor the effect of the surcharge on the rate of sales-per-hour at the location. Based on the effect, the merchant may identify a set of rates. Each member of the set may include a rate of sales-per-hour that is not less than a threshold rate. The threshold rate may correspond to a target rate of sales-per-hour desired by the merchant. The merchant may identify one or more surcharges that correspond to members of the set of rates.

The code may cause the computer to identify the surcharge corresponding to one member of the set of rates. For example, the merchant may impose the surcharge that corresponds to the highest rate within the set. The code may be cause the computer to select any suitable surcharge. For example, the merchant may average the one or more surcharges that correspond to members of the set of rates. The merchant may impose any surcharge based on the surcharges that correspond to the members of the set of rates.

The code may cause the computer to receive the value. Based on the value, the computer may be configured to transmit an authorization request to charge the payment instrument an amount that is not less than a sum of the surcharge and a price. The value may be a geographical value. The value may be a temporal value.

For example, the merchant may detect that the transaction includes an attribute corresponding the geographical value. The geographical value may be an address of a retail location or GPS coordinates of a mobile device. The merchant may identify the surcharge based on the set of performance metric quantities.

The code may cause the computer to adjust the surcharge. The code may cause the computer to measure an effect of the surcharge on the performance metric. The effect may correspond to a change in the performance metric quantities. The code may cause the computer to determine the plurality of performance metric quantities based on the effect of the surcharge on the performance metric.

For example, the merchant may impose the surcharge based on the surcharge fraction. The merchant may initially begin imposing the surcharge based on a surcharge fraction close to zero. The merchant may increase the surcharge fraction. The merchant may continue to increase the surcharge fraction and monitor an effect of the surcharge on an exemplary performance metric such as gross receipts.

If an exemplary performance metric quantity, such as a number of gross receipts, falls below the threshold, the merchant may begin to decrease the surcharge fraction. The merchant may continue to decrease the surcharge fraction and monitor an effect of the surcharge on the performance metric. The merchant may identify the surcharge fraction that corresponds to the performance metric quantity that is above the threshold.

The code may cause the computer to identify, for a plurality of values, the surcharge that corresponds to the set of performance metric quantities. Members of the set of performance metric quantities may include quantities that are not less than the performance metric threshold. The plurality of values may include a geographic value and a temporal value.

For example, the merchant may identify, for a given location and given time, the surcharge that corresponds to a member of the set of performance metric quantity that is above the threshold.

Apparatus may include a device configured to recover the transaction cost associated with the transaction. The transaction may be executed using the payment instrument. The apparatus may include a point-of-sale device. The point-of-sale device may include a terminal that accepts a "card swipe" or other payment instrument input.

The apparatus may include a processor. The processor may be configured to associate a charge request with the value. The processor may be configured to associate a credit card transaction with the value. The request may correspond to the "card swipe" of the customer. The value may correspond to a geographic value, a temporal value, a MCC, an amount or any suitable value. Exemplary values are shown above in Table 4.

The point-of-sale device may include the processor. The apparatus may include a surcharge engine. The surcharge engine may include a transaction record database. The transaction record database may include one or more transaction records. Each transaction record may include one or more fields. Each field may include an attribute associated with the transaction. The value may correspond to the attribute.

The transaction records may include derived values. Exemplary derived values may include the surcharge sensitivity, the surcharge, or recovery amount. The surcharge engine may include a processor. The processor may be configured to identify a pattern among the transaction records stored in the database. The pattern may be a derived value. The pattern may be correlation. The pattern may be a trend. The pattern may be a statistical relationship. The pattern may be used to derive the performance metric.

Based on the pattern, the surcharge engine may determine the derived value. For example, based on an analysis of stored transaction records, the surcharge engine may determine that, generally, within a geographic region, the surcharge is correlated with a decrease in a number of items purchased. Each stored transaction record that "fits" into the pattern may be associated with a first derived value. Each transaction record that does not "fit" into the overall pattern may be associated with a second derived value.

The performance metric may be included in the one or more fields. The performance metric may be an attribute of the transaction record.

The processor may be configured to select a recovery amount. The recovery amount may correspond to the surcharge. The recovery amount may correspond to the transaction cost. The recovery amount may be selected based on an attribute of the transaction record. The recovery amount may be associated with a payment instrument.

The processor may be further configured to calculate a total purchase price. The total purchase price may be based on the recovery amount. For example, a cost to the merchant of accepting the payment instrument may be a percentage of the price of the product. The merchant may include the recovery amount in a displayed price presented to a customer. The customer may be charged the recovery amount each time the customer makes a purchase using the payment instrument. The merchant may structure the recovery amount by offering to discount the displayed price if the customer pays using an alternative to the payment instrument. The alternative may include a payment method associated with a lower transaction cost than the payment instrument. The alternative may include cash, a check or a debit card.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
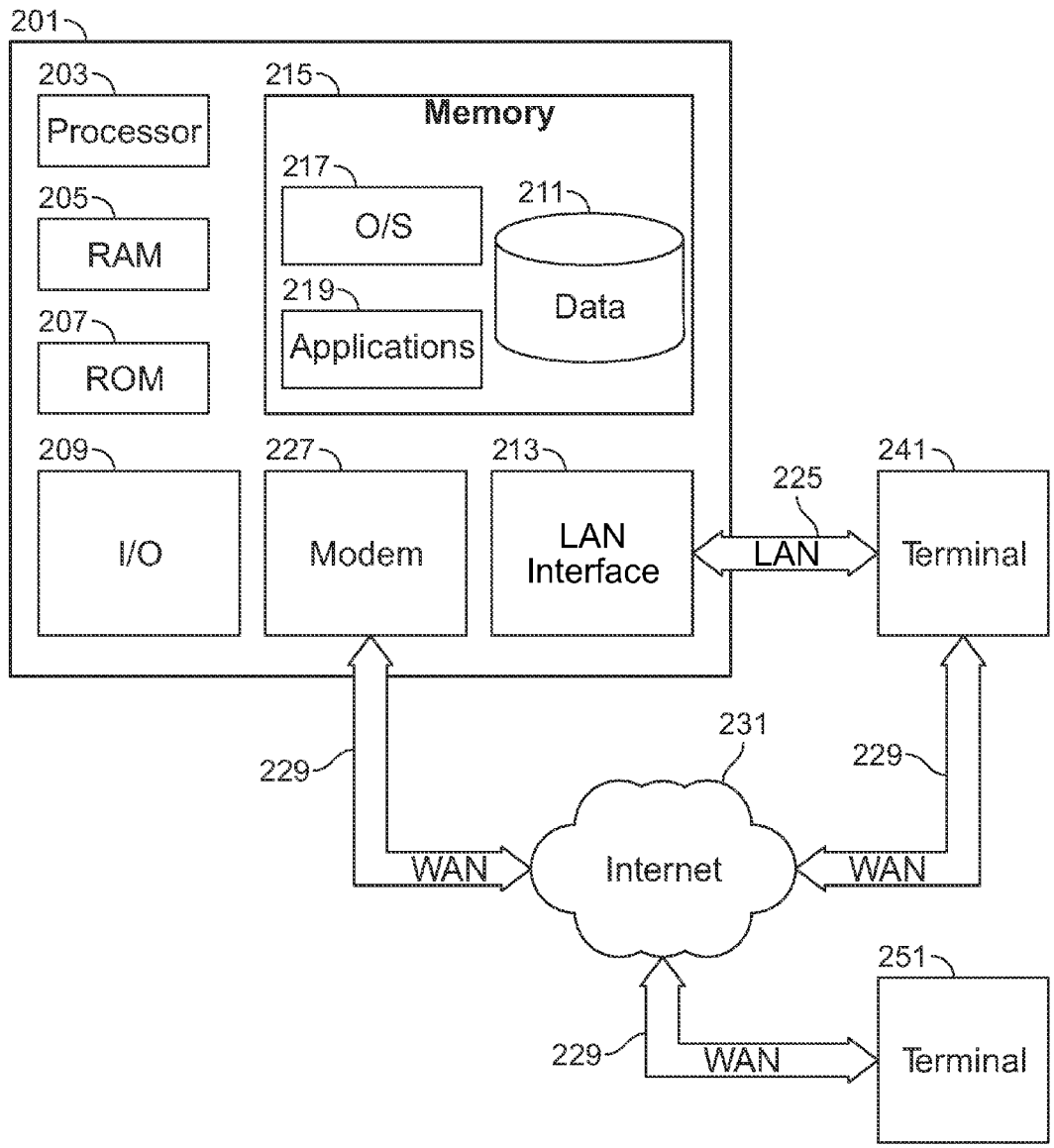
FIG. 2 shows illustrative apparatus in accordance with the principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 225. Server 201 may include one or more receiver modules, server modules and processors that may be configured to receive transaction information, receive transaction surcharge rules, receive transaction participant information, receive transaction service provider information, apply surcharge rules, generate transaction information, compare values to criteria and perform any other suitable tasks related to recovering the transaction cost.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling server 201 to perform various functions. For example, memory 225 may store software used by server 201, such as an operating system 217, application programs 219, and an associated database 221. Alternatively, some or all of server 201 computer executable instructions may be embodied in hardware or firmware (not shown). As described in detail below, database 221 may provide storage for customer information, values, criteria, performance metrics, performance metrics quantities, thresholds, transaction information, merchant information, transaction cost information, transaction fee factors, surcharge rules and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, smart phone, tablet, or any other suitable device for storing, transmitting and/or transporting relevant information.

Any information described above in connection with database 221, and any other suitable information, may be stored in memory 225.

One or more of applications 219 may include one or more algorithms that may be used to receive transaction information, receive surcharge rules, receive transaction participant information, receive transaction service provider information, apply surcharge rules, generate transaction information and perform any other suitable tasks related to applying the surcharge to the transaction.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
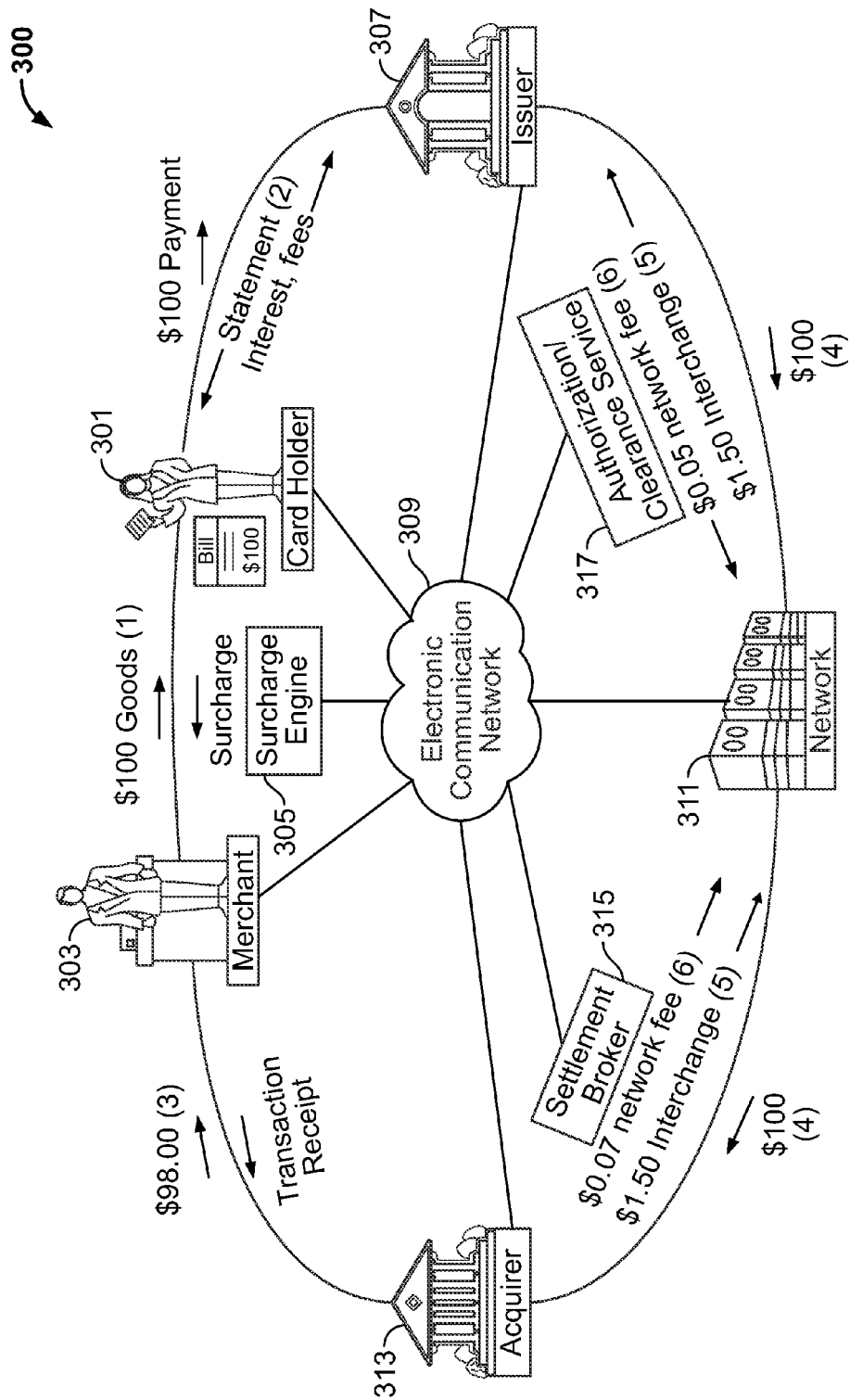
FIG. 3 shows an arrangement in which apparatus and methods in accordance with the principles of the invention may be used.

FIG. 3 shows illustrative credit card transaction settlement flow 300.

At step 1 card holder 301 may offer a payment instrument, such as a credit card, as payment for $100 of goods sold by merchant 303. Card holder 301 may present information associated with the credit card at the merchant's point-of-sale terminal (not shown). The information may be presented via the payment instrument, a loyalty card or any other suitable device or method.

Based on the information presented by card holder 301, surcharge engine 305 may determine a transaction cost recovery amount. The surcharge engine may determine the surcharge or surcharge fraction. The recovery amount may be based on the surcharge fraction.

The recovery amount may be added to the $100 price of goods offered by merchant 303. The $100 price may include a default recovery amount. A total amount may be determined. The total amount may include the price, recovery amount, sales tax and any other suitable costs associated with the purchase of the goods.

The information presented by card holder 301, may be transmitted via electronic communication network 309 to transaction network 311.

Transaction network 311 may receive the information presented by card holder 301 via electronic network 309. Based on the received information, transaction network 311 may transmit an authorization, via electronic communication network 309, to merchant 303. Transaction network 311 may verify that card holder 301 has not exceeded a credit limit associated with the payment instrument. The authorization may include an indication that the transaction network has approved a charge of the total amount to an account associated with the payment instrument.

Card holder 301 may acknowledge the total amount. The acknowledgement may include an agreement by card holder 301 to place the charge on the account associated with the payment instrument. The acknowledgement may include a commitment by the card holder to pay the total amount to issuer 307.

At step 2, issuer 307 may prepare a statement for card holder 301. The statement may include the total amount owed to issuer 307. The statement may include interest or other fees owed to issuer 307. Issuer 307 may bear an expense of collecting the total amount, interest and fees from card holder 301. A portion of the transaction cost may flow to issuer 307 to fund collection efforts of issuer 307 and offset a risk of default of card holder 301.

At step 3, merchant 303 may present the acknowledgment of card holder 301 and/or the associated authorization by transaction network 311 to acquirer 313. Acquirer 313 may transfer funds to merchant 303 prior to actual collection, by issuer 307, of the total amount from card holder 301. Acquirer 313 may offer funds to merchant 303 prior to settlement between acquirer 313 and issuer 307.

Acquirer 313 may deduct a merchant discount from an amount of funds transferred to merchant 303. The recovery amount determined by surcharge engine 305 may offset, at least in part, the merchant discount. The recovery amount may be limited to transaction costs charged by transaction network 311. The recovery amount may include transaction costs charged by acquirer 313 and issuer 307.

In flow 300, the merchant discount is 2% of the $100 price. Without an offset, merchant 303 receives $98 of the $100 price.

At step 4, acquirer 313 settles the transaction with issuer 307. Acquirer 313 may utilize transaction network 311 to settle the transaction. Acquirer 313 may utilize broker 315 to settle the transaction. Broker 315 may offer settlement services at a lower transaction cost than transaction network 311. Broker 315 may offer the lower transaction costs as a result of aggregating transactions from different acquirers. Each of the aggregated transactions may require settlement between issuer 307 and acquirer 313.

Step 4 shows that at least a portion of the merchant discount flows through transaction network 311 from acquirer 313 to issuer 307. Step 4 also shows that transaction network 311 may receive a network fee from acquirer 313. Step 4 also shows that transaction network 311 receives a network fee from issuer 307. Acquirer 313 and issuer 307 may pay transaction network 311 network fees for facilitating settlement of the transaction.

Table 6 shows net positions of the parties to flow 300.

TABLE 6

Net positions.

| Party | Net ($) |
|---|---|
| Issuer | 1.45 |
| Acquirer | 0.43 |
| Network | 0.12 |
| Merchant | 0 |
| Customer | −2.00 |

Table 7 shows benefits of flow 300 to the transaction participants.

TABLE 7

Illustrative benefits of each transaction participant.

| Party | Benefit |
|---|---|
| Merchant | Access to card holder funds and credit |
| | Timely settlement |
| | Protection from customer fraud and credit risk |
| | Increased purchase price amounts |
| | Payment guaranteed |
| Issuer | Reliable payment platform with broad acceptance |
| | Consistent customer experience across merchants |
| | Predictable source of revenue to support card issuance costs |
| Card holder | Access to ready funds and credit |
| | Ability to make purchases virtually anywhere |
| | Protection from fraud |
| | Protection from merchant disputes |
| | Reward for card based purchases |
| | Does not need to carry cash |

Figure 4:
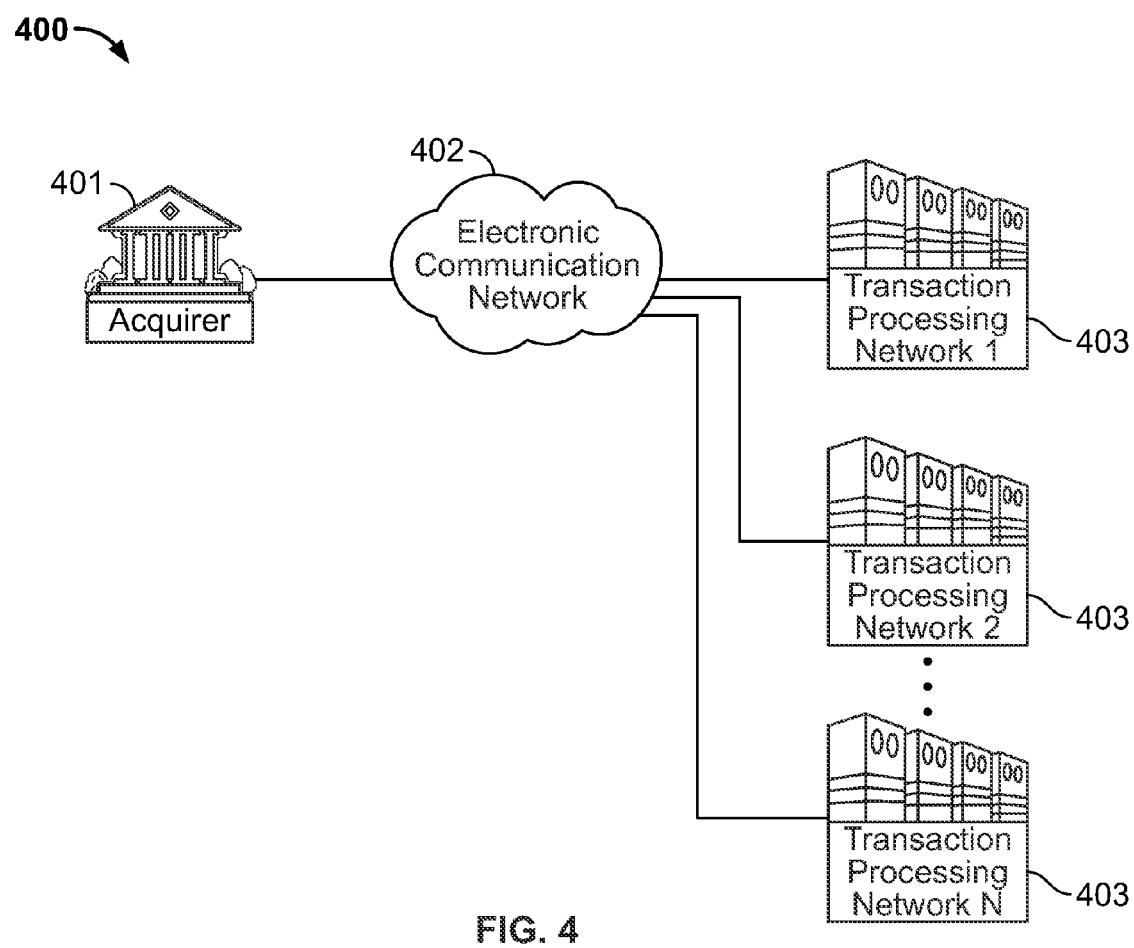
FIG. 4 shows another illustrative apparatus in accordance with the principles of the invention.

FIG. 4 shows illustrative network 400. Network 400 may include acquirer 401, electronic communication network 402 and transaction processing networks 403. Acquirer 401 may receive transactions from a merchant, such as merchant 303 (shown in FIG. 3). Acquirer 401 may wish to settle the transactions and receive payment from an issuer, such as issuer 307 (shown in FIG. 3). Acquirer 401 may wish to settle the transactions using a transaction network other than the transaction network that authorized the transactions. Acquirer 401 may submit a query to electronic communication network 402. Electronic communication network 402 may be operated by a broker.

Electronic communication network 401 may be configured to select one of transaction networks 403 that offers the lowest transaction cost to settle the transactions held by acquirer 401. Electronic communication network 402 may be configured to select one or more of transaction networks 403 to settle the transaction based on any suitable criteria. Exemplary criteria may include the transaction network associated with the payment instrument, the issuer associated with the transaction, a volume of transactions, a value of the transactions or a risk associated with the transactions.

Figure 5:
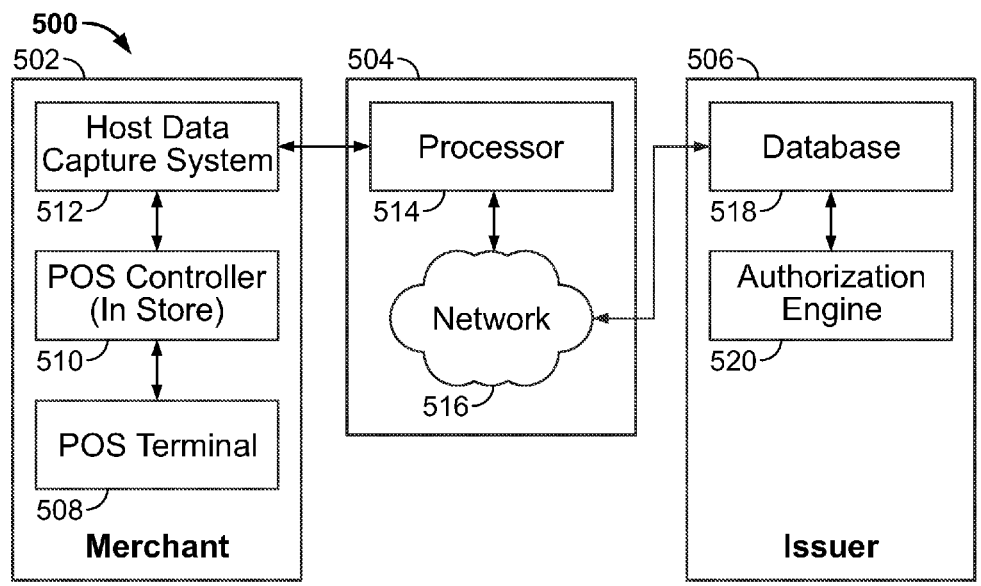
FIG. 5 shows yet another illustrative apparatus in accordance with the principles of the invention.

FIG. 5 shows illustrative system 500 for processing and communicating transaction cost information. System 500 may include merchant component 502, network component 504 and issuer component 506. In general, a system such as 500 may include many merchant components such as 502, many issuer components such as 506 and many network components such as 504.

A customer may purchase goods by transferring customer information from a personal data storage device, such as a credit card, to point-of-sale ("POS") terminal 508. POS terminal 508 may read the customer information from the card. The card may store data in a magnetic strip, a bar code, a silicon chip or any other suitable data storage device or format.

The customer information may include issuer information, account information and any other suitable information.

POS terminal 508 may transmit transaction information to POS controller 510. The transaction information may include some or all of the customer information and any other suitable information, such as the transaction amount, information regarding the purchased goods and one or more values associated with the transaction.

POS controller 510 may act as a server for providing user prompts and display layout information to one or more POS terminals such as POS terminal 508. POS controller 510 may receive transaction information from one or more of the POS terminals.

POS controller 510 may transmit the transaction information to host data capture system 512. Host data capture system 512 may store transaction information from POS controller 510. Host data capture system 512 may store accounting data, inventory data and other suitable data that may be included in the transaction information.

The transaction information may include merchant information. The merchant information may include the criterion. The merchant information may include information about the merchant, the merchant's business, the merchant's network membership, the merchant's business behavior and any other suitable information.

Transaction information may include some or all of the information that is necessary to identify the transaction cost of the transaction. The transaction cost may depend on one or more transaction fee factors, such as interchange rate, network rates, merchant type, merchant size, transaction processing method, and any other suitable factors. Transaction cost information may include one or more of the foregoing factors and any other suitable factors.

The transaction cost information may be stored in any suitable element of merchant component 502, network component 504 and issuer component 506. For example, transaction cost information may be stored in processor 514. Processor 514 may include algorithms that may be used in conjunction with the transaction cost information to identify the transaction cost corresponding to the customer transaction taking place at POS terminal 508. After the transaction cost is identified, processor 514 may transmit the transaction cost, via merchant components 502, to POS controller 510. POS terminal 508 may display the transaction cost for viewing by the customer.

Host data capture system 512 may create a transaction record based on the transaction information. The transaction record may include some or all of the transaction information. The transaction information may include one or more values that correspond to one or more attributes of the transaction. POS controller 510 may be configured to determine the surcharge. Host data capture system 512 may be configured to determine the surcharge. The surcharge may be determined using any suitable component of system 500. The surcharge may be based on the transaction information. The surcharge may be displayed at POS terminal 508.

POS terminal 508 may have one or more interactive features that the customer may use. The features may provide the customer with information that may help the customer decide whether to execute the transaction. The customer may use the features to obtain more information about the merchant, the transaction, the transaction cost, transaction costs associated with different payment instruments (e.g., credit cards, debit cards, instruments or devices that include a contact chip, such as an ISO14443-compliant contactless chip, or other electronic purchasing devices), surcharge or other suitable information.

Host data capture system 512 may route the transaction record to processor 514. Processor 514 may include a credit card network "processor," which is known to those of ordinary skill in the art. The illustrative systems shown in FIGS. 5 and 6 may include one or more other processors that perform tasks that are appropriate for the components thereof.

Processor 514 may route the transaction record, via network 516, to database 518. The routing may be governed by the transaction information. For example, the routing may be governed by a bank issuer number ("BIN") that is encoded in the customer's credit card. Authorization engine 520 may render a transaction authorization decision based on the transaction information.

Authorization engine 520 may transmit authorization information back to POS terminal 508 through network 516, processor 514, host data capture system 512 and POS controller 510. The authorization information may include the authorization decision (e.g., "GRANTED" or "DENIED"). The authorization information may include some or all of the transaction information. The transaction information may be used by processor 514 to route the authorization information back to the merchant and the POS terminal where the customer is present.

Figure 6:
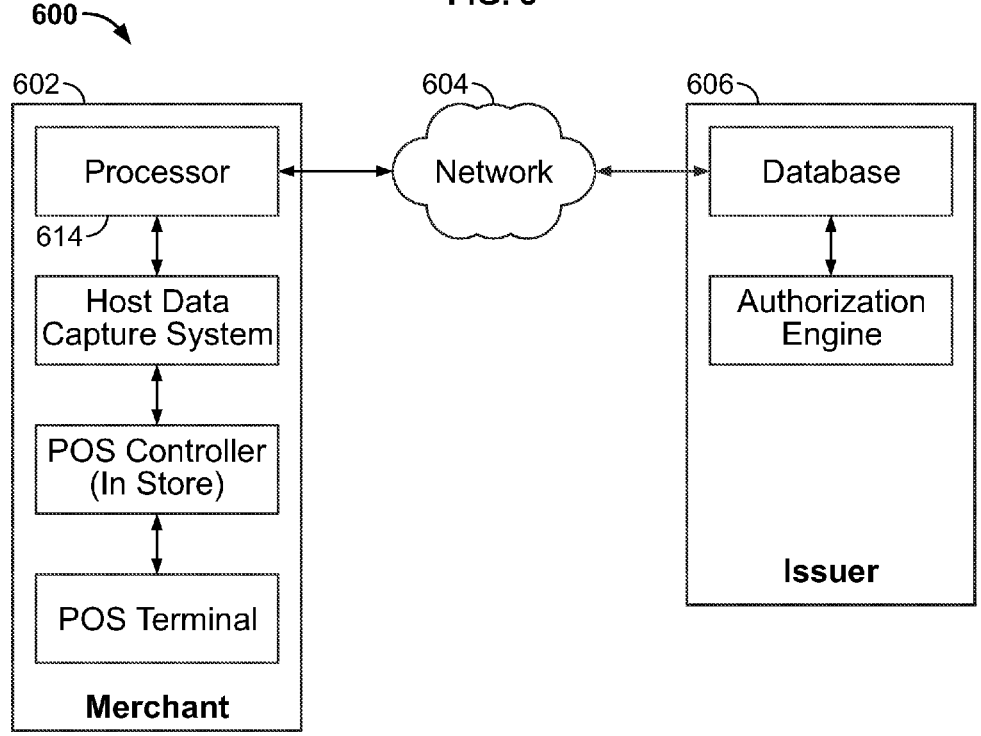
FIG. 6 shows yet another illustrative apparatus in accordance with the principles of the invention.

FIG. 6 shows illustrative system 600 for processing and communicating transaction cost information. System 600 may include merchant component 602, network component 604 and issuer component 606. In general, a system such as 600 may include many merchant components such as 602 and many issuer components such as 606. System 600 may have one or more of the features that are described herein in connection with system 500.

In system 600, processor 614 may be present in merchant component 602. Corresponding processor 514 is present in network component 504 (shown in FIG. 5). Processes in accordance with the principles of the invention may include one or more features of the process illustrated in FIGS. 5-6.

Figures 7, 8:
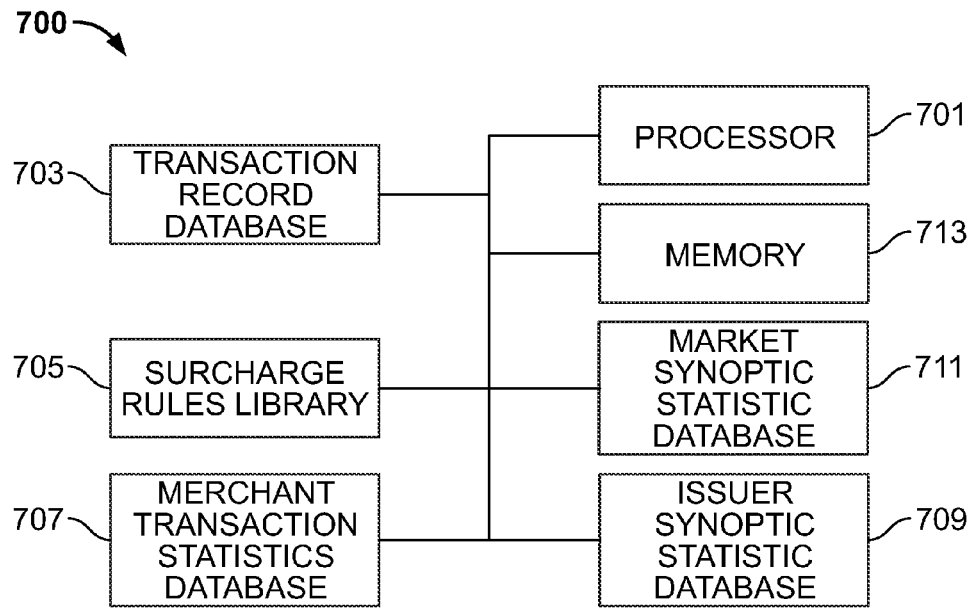
FIG. 7 shows yet another illustrative apparatus in accordance with the principles of the invention.
FIG. 8 shows illustrative information in accordance with the principles of the invention.

FIG. 7 shows illustrative system 700. System 700 includes illustrative components for determining the surcharge. System 700 may be included in system 500 (shown in FIG. 5) or system 600 (shown in FIG. 6).

System 700 includes transaction record database 703. Transaction record database 703 may store transaction records. Each stored transaction record may include one or more values. The one or more values may correspond to transaction attributes. Processor 701 may search transaction record database 703 for patterns among the stored transaction records. The patterns may be based on the transaction attributes.

Based on the patterns, processor 701 may generate statistics associated with the stored transaction records in database 703. The statistics may include merchant transaction statistics 707. Merchant transaction statistics 707 may include one or more correlations between a performance metric and a transaction attribute. Exemplary merchant transaction statistics 707 may include a correlation between sales volume and recovery amount.

The statistics may include market synoptic statistics 711. Exemplary Market synoptic statistics 711 may include surcharge sensitivity within a particular market or geographic region.

The statistics may include issuer synoptic statistics 709. Exemplary issuer synoptic statistics 709 may include an effect of the surcharge on revenue of an issuer.

Surcharge rules library 705 may include one or more rules for determining the surcharge. Rules library 705 may determine the surcharge for a current transaction. The one or more rules may be based on merchant transaction statistics, market synoptic statistics, issuer synoptic statistics or any suitable statistics.

FIG. 8 shows illustrative transaction record 800. Transaction record 800 may be generated based on transaction information received and/or available at a time of purchase. The transaction record may include POS attributes 801. The value may correspond to POS attributes 801. The criterion may correspond to one or more of POS attributes 801. POS attributes 801 may include transaction information, customer information and merchant information (discussed regarding FIG. 5.) Exemplary POS attributes 801 may include a date, a time, a check-out lane indicator or any suitable transaction attribute available at a point-of-sale.

Transaction record 800 may include surcharge attributes 803. The value may correspond to one or more of surcharge attributes 803. The criterion may correspond to one or more of surcharge attributes 803. Exemplary surcharge attributes 803 may include a surcharge, a surcharge fraction, a maximum allowable surcharge, a transaction cost, recovery amount or other suitable surcharge information.

Transaction record 800 may include synoptic attributes 805. The value may correspond to one or more of synoptic attributes 805. The criterion may correspond to one or more of synoptic attributes 805. Synoptic attributes 805 may include attributes derived by system 600 (shown in FIG. 6) or system 700 (shown in FIG. 7). Exemplary derived attributes may include a merchant transaction statistic, a market synoptic attribute statistic and an issuer synoptic statistic. Based on a statistical pattern, synoptic attributes 805 may be concatenated to transaction record 800. Synoptic attributes 805 may be concatenated to transaction record 800 after execution of the transaction.

Figure 9:
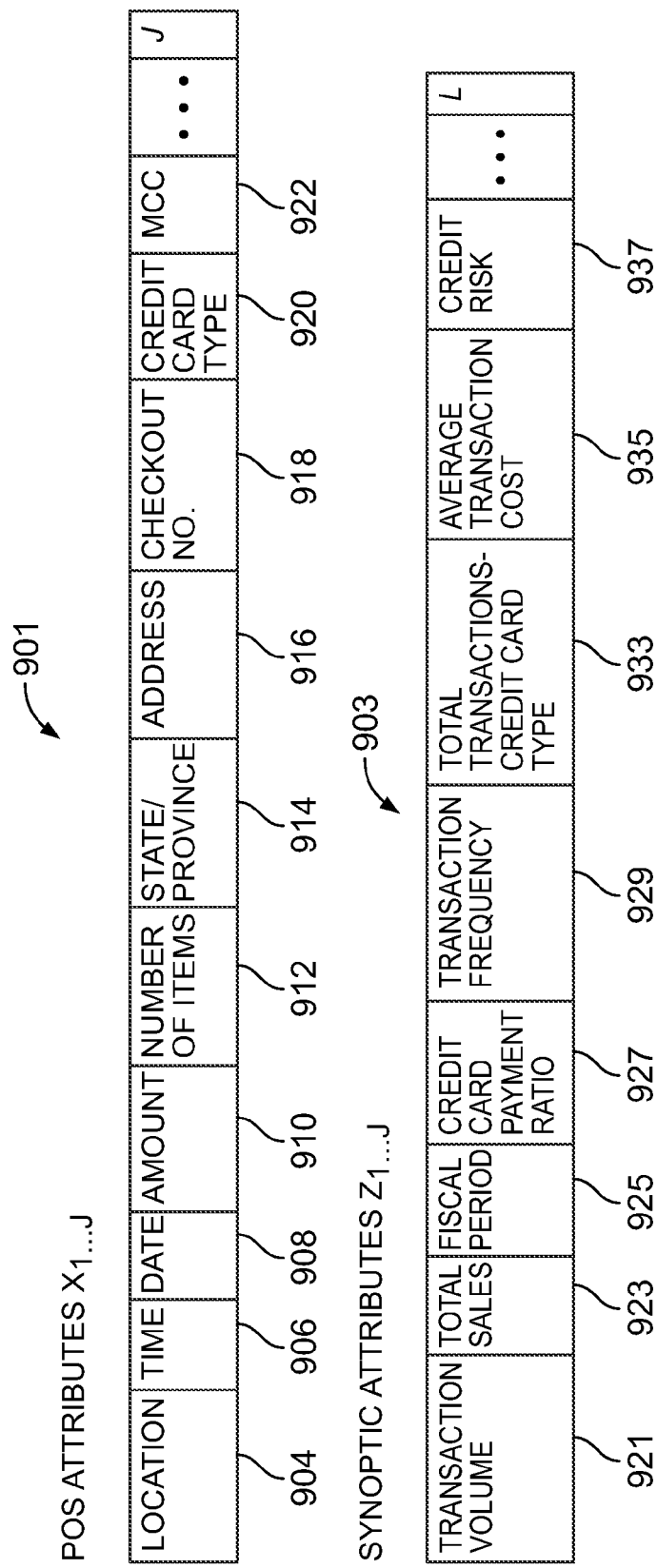
FIG. 9 shows illustrative information in accordance with the principles of the invention.

FIG. 9 shows illustrative POS attributes 901 and illustrative synoptic attributes 903. The value may correspond one or more of attributes 901. The value may correspond one or more of attributes 903. The criterion may correspond to one or more of attributes 901. The criterion may correspond to one or more of attributes 903.

POS attributes 901 may include location 904. Location 904 may be associated with a POS terminal. Location 904 may be associated with an address. POS attributes 901 may include time 906 and date 908. The value may correspond to time 906. The value may correspond to date 908.

POS attributes 901 may include amount 910 and number of items 912. Amount 910 may correspond to a price of the product. Number of items 912 may correspond to a number of items purchased by a customer in a transaction.

POS attributes 901 may include state/province 916. State/province 914 may be associated with regulations governing imposition of a surcharge.

POS attributes 901 may include checkout number 918. A merchant may offer different surcharge schedules at different check-out lines at a location. The merchant may offer no or a reduced surcharge if a self-checkout line is utilized. The self-checkout line may be associated with a checkout number 918.

POS attributes 901 may include credit card type 920. Credit card type 920 may correspond to the payment instrument presented by a customer to pay for a purchase. A surcharge schedule or amount may be associated with credit card type 920.

POS attributes 901 may include merchant category code ("MCC") 922. MCC 922 may group merchants that sell a class of product. Some merchants in MCC 922 may impose a surcharge, while others may not. Merchants within MCC 922 may surcharge at different rates or amounts.

FIG. 9 includes synoptic attributes 903. Synoptic attributes 903 may include transaction volume 921, total sales 923 and fiscal period 925. Transaction volume 921 and total sales 923 may be associated with fiscal period 925.

For example, transaction records may be sorted by date 908 and location 904. A first number of transaction records may include the month of September and an address on Main Street. The first number may be appended to each transaction record that includes the date in September and the address on Main Street. The first number may correspond to transaction volume 921. The first number may be a synoptic attribute. A second number of transaction records may include a date in the month of August and the address on Main Street. The second number may be a synoptic attribute.

The first number may be compared to the second number. A result of the comparing may be a synoptic attribute. The first number may be concatenated to transaction records that include the date in September. The second number may be concatenated to transaction records that include the date in August. A result of the comparing may be concatenated to transaction records that include either the date in August or the date in September.

Synoptic attributes 903 may include credit card payment ratio 927. Credit card payment ratio 927 may include a comparison of a number of purchases made using a credit card compared to a number of purchases made using alternative payment methods. The ratio may be computed for a particular merchant, MCC, time/date, location credit card type or other suitable transaction attribute.

Synoptic attributes 903 may include transaction frequency 929, total transactions per credit card type 933 and average transaction cost 935. Average transaction cost 935 may be calculated for a plurality of transaction records.

For example, each transaction record that includes a particular POS attribute, such as a purchase made at location X, may include a transaction cost Y. The transaction cost Y may correspond to a surcharge attribute (shown in FIG. 8, item 803). Average transaction cost 935 may correspond to an average transaction cost associated with location X. Average transaction cost 935 may be appended to each transaction record that includes the attribute corresponding to location X.

Synoptic attributes 903 may include credit risk 937. An issuer may associate each authorized transaction with a credit risk. The issuer may append the credit risk to the transaction record.

Synoptic attributes 903 may be used to formulate a rule stored in surcharge rules library 705 (shown in FIG. 7).

Figures 10, 11:
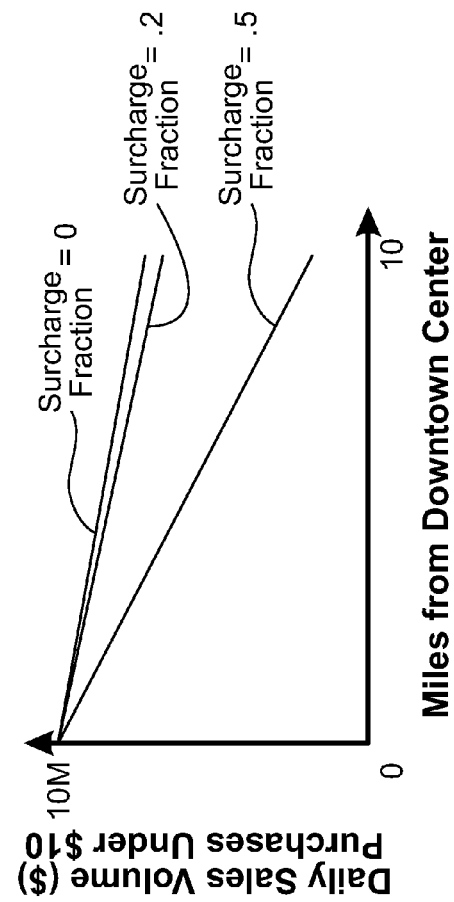
FIG. 10 shows illustrative information in accordance with the principles of the invention.
FIG. 11 shows illustrative information in accordance with the principles of the invention.

FIG. 10 shows illustrative transaction records 1000. Each of transaction records 1000 is associated with a date 1011. Synoptic attributes may be derived by grouping individual transaction records that share one or more attributes. Records 1001 and 1003 may be grouped based on the surcharge attribute. The surcharge attribute may correspond to a range of surcharge fractions. Records 1001 and 1003 may also be grouped based on date 1011, MCC 1008, number of items 1007 or credit card identifier 1006.

For example, based on a grouping of transaction records 1001 and 1003, a synoptic attribute may be derived that correlates the surcharge fraction to sale amount 1005 or number of items sold 1007 within region 1009 or on date 1011.

FIG. 11 shows a graphical representation of statistical patterns detected in stored historical transaction records. The graphical representations may be based on synoptic attributes 903 (shown in FIG. 9).

FIG. 11 shows a relationship between a given surcharge fraction and a daily sales volume of items less than ten-dollars. FIG. 11 shows that if the surcharge fraction is between 0 (no surcharge applied) and 0.2, sales volume decreases as a distance from a downtown city center increases. FIG. 11 also shows that if the surcharge fraction is 0.5, sales volume decreases more rapidly as a distance from the downtown city center increases.

Based on the graphical representation, the merchant may decide to alter a surcharging practice or schedule. For example, based on FIG. 11, the merchant may decide to apply a variable surcharge fraction based on a distance from the downtown city center. Based on FIG. 11, an issuer or transaction network may decide to reduce transaction costs associated with purchases under ten-dollars. The issuer or transaction network may investigate whether the greater the distance from the downtown city center there are fewer merchants willing to accept a credit card as payment for a purchase under $10. The fewer merchants that are willing to accept the credit card payment for purchases under $10 may result in the lower sales volume.

Figure 12A:
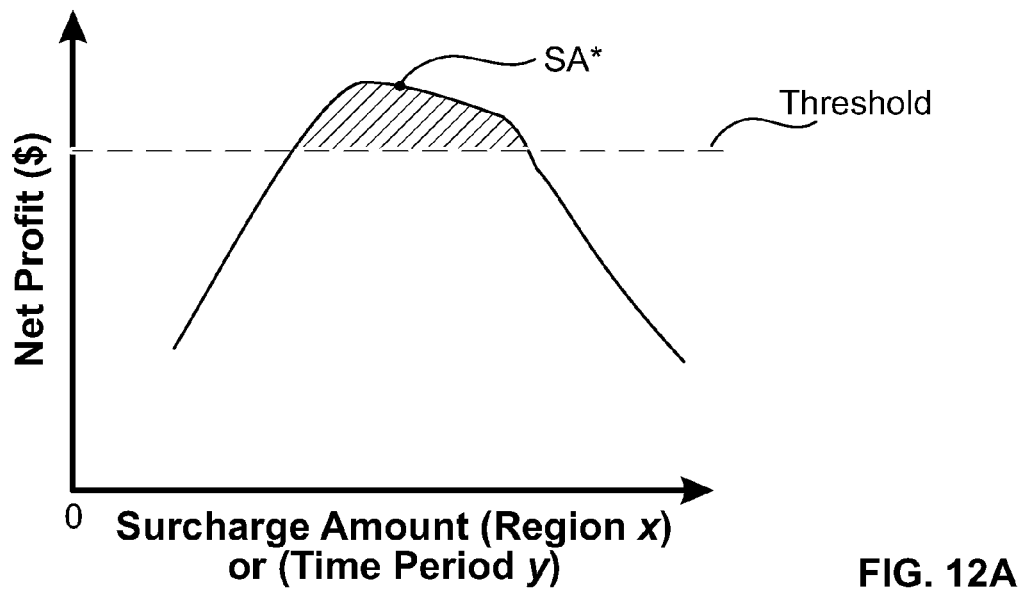
FIG. 12A shows illustrative information in accordance with the principles of the invention.

FIG. 12A shows a graph that plots a performance metric, net profit, against a surcharge. The surcharge may be specific to a region X, time Y or any suitable transaction attribute. FIG. 12A shows that when the surcharge is increased beyond amount SA*, net profit begins to decline. A merchant may select a desired threshold level of net profit and structure the surcharge such that, statistically, net profit will not fall below the threshold. For example, the merchant may elect to surcharge an amount equal to SA*.

Figure 12B:
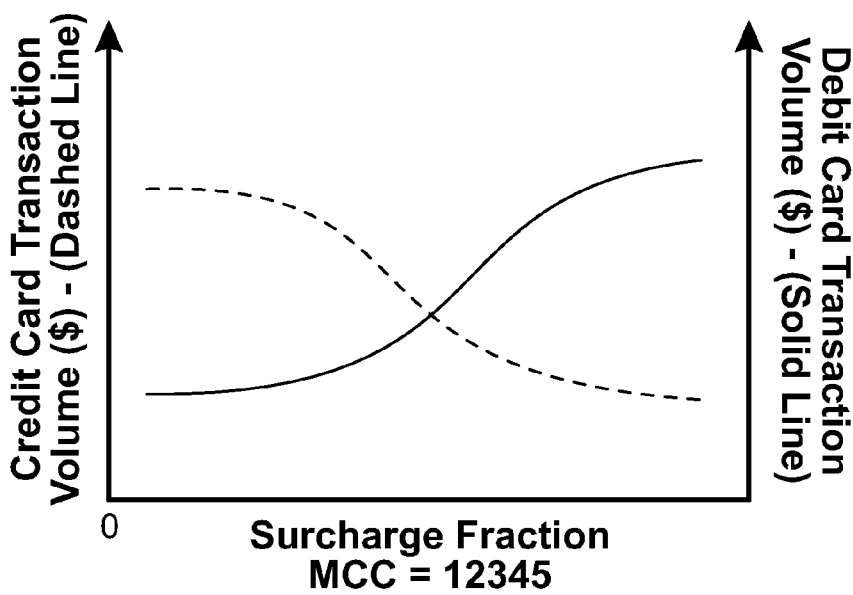
FIG. 12B shows illustrative information in accordance with the principles of the invention.

FIG. 12B shows a graph that plots two performance metrics, credit and debit card transaction volumes, against a surcharge fraction. The graph may be based on data gathered from merchants associated with merchant category code 12345.

FIG. 12B shows that as the surcharge fraction increases from 0 (no surcharge) to 1 (maximum surcharge), the volume of credit card transactions decreases for merchants associated with the given MCC. FIG. 12B also shows that as the surcharge fraction increases from 0 to 1, the volume of debit card transactions increases for the given MCC. The decrease in credit card volume and corresponding increase in debit card volume may correspond to a recovery amount associated with a debit or credit card transaction. A credit card transaction may be associated with a higher transaction cost than the debit card transaction. A credit card may be associated with a higher surcharge and corresponding recovery amount than a debit card. A higher transaction cost of a credit card transaction may result in a surcharge being imposed by a merchant to recover the transaction cost.

FIG. 13 shows illustrative information 1300. Information 1300 includes regions 1, 2, 3, 4, 5 and 6. Each region may be associated with a surcharge schedule. Each region may be associated with a surcharge fraction. The associated surcharge fraction may be determined based on attributes relevant to each region. For example, the associated surcharge fraction may be determined based on transaction records, and attributes contained therein, generated based on transactions that occur within each region.

Each region may be defined by a distance from a point, a geometric shape, natural landmarks or any suitable method of demarcation. An area or size of each region may be determined based on a correlation between one or more attributes of transaction records generated within an encompassing region such as region 6.

FIG. 14 shows illustrative information 1400. Information 1400 includes an illustrative surcharging schedule for each of regions 1, 2, 3, 4 and 5.

Information 1400 shows that region 1 may include a sports stadium. Based on an analysis of historical transaction records, region 1 may be associated with a surcharge that fluctuates based on whether a sporting event is being held at the stadium. Schedule 1401 shows that transactions in region 1 are associated with a surcharge fraction of 0.9 during the sporting event. Schedule 1401 also shows that transactions in region 1 are associated with a surcharge fraction of 0.2 during non-game times.

Schedule 1403 shows an illustrative surcharge schedule for region 2. Region 2 may include a transportation hub such as a train or bus station. Schedule 1403 may include applying a surcharge fraction of 0.6 to transactions during peak travel times and a surcharge fraction of 0.2 to transactions during off-peak travel times.

Regions 3, 4 and 5 may include surcharge schedules that apply a constant surcharge fraction to purchases made at any time within each region. The surcharge fraction associated with a region may be based on one or more attributes associated with transaction records generated within the region or a performance metric relevant to the region.

Figure 15:
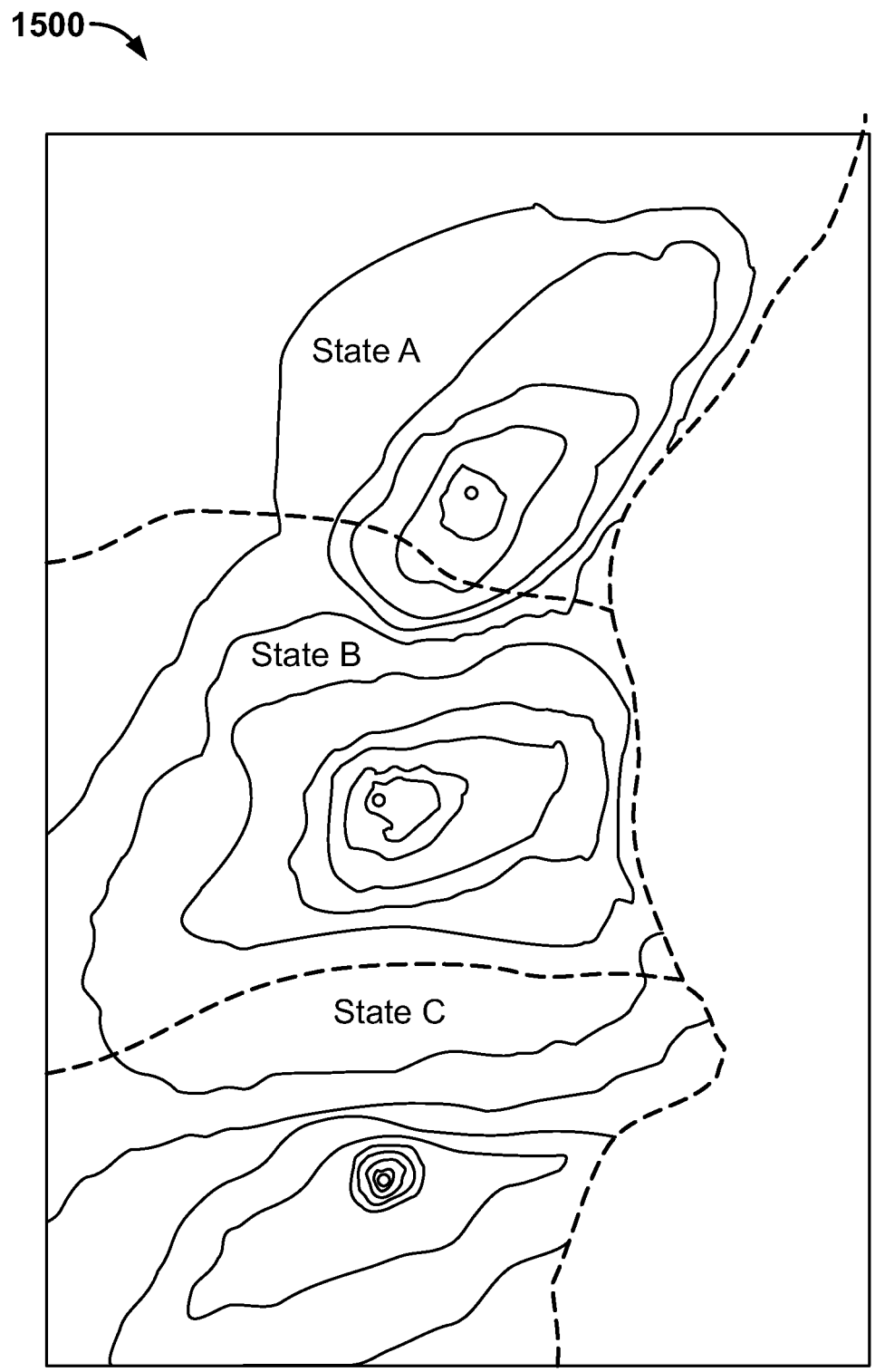
FIG. 15 shows illustrative information in accordance with the principles of the invention

FIG. 15 shows an illustrative surcharge sensitivity map 1500. Map 1500 shows regions of surcharge sensitivity across states A, B and C. Contour lines that are more closely spaced correspond to a region that exhibits a greater sensitivity to changes in the surcharge. Contour lines that are spaced further apart correspond to regions that exhibit less of a sensitivity to changes in the surcharge.

Map 1500 may be created based on transactions that occur within states A, B and C. Map 1500 may be created based on POS attributes, surcharge attributes and synoptic attributes associated with transaction records generated within states A, B and C. Map 1500 may be created based on comparing transaction records generated within states A, B and C to transaction records generated outside states A, B and C.

Figure 16:
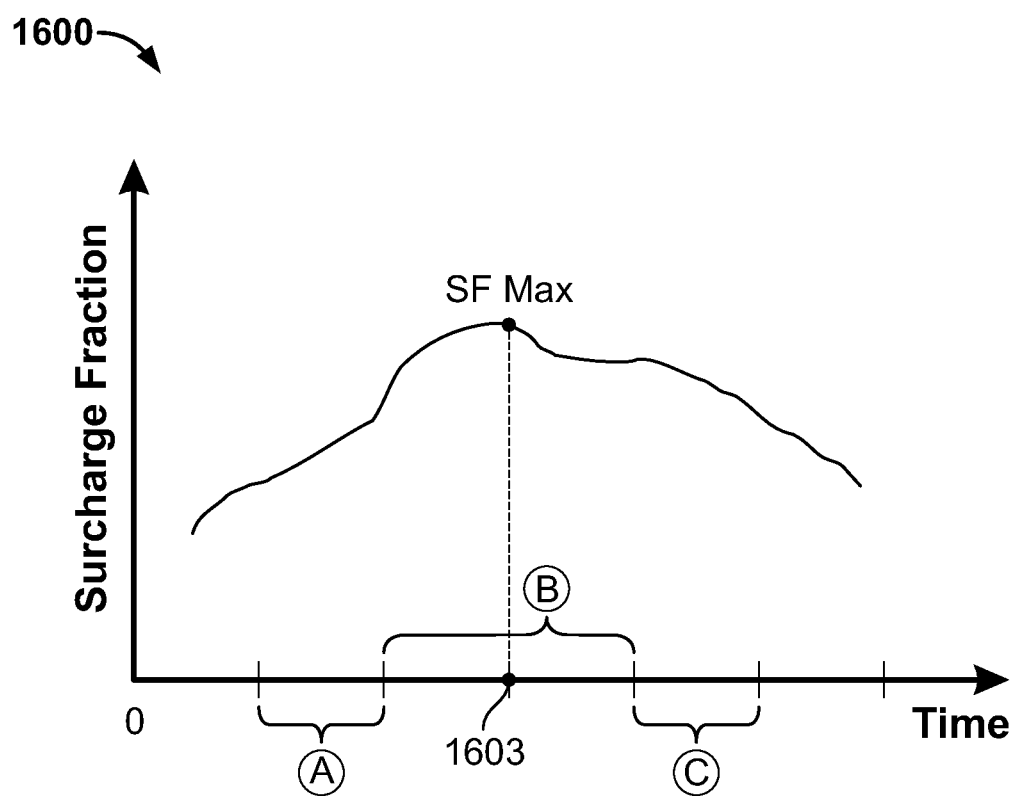
FIG. 16 shows illustrative information in accordance with the principles of the invention.

FIG. 16 shows illustrative graph 1600. Graph 1600 plots surcharge fraction ("SF") versus a timeline. The timeline may correspond to an event time. For example, duration A may correspond to a period of time prior to a start of an event. Duration B may correspond to the event. Duration C may correspond to a period of time following a conclusion of the event.

Graph 1600 shows that the surcharge fraction may fluctuate with time. A surcharge fraction may be associated with a point on the timeline. For example, point 1603 may be associated with a surcharge fraction equal to $SF_{max}$. $SF_{max}$ may correspond to a maximum surcharge fraction imposed on transactions during the event time.

An association between the surcharge fraction and the event time may be based on a performance metric associated with the event or any suitable performance metric. An association between the surcharge fraction and the event time may be based on an attribute of transactions that occur before, after or during the event time.

Figure 17:
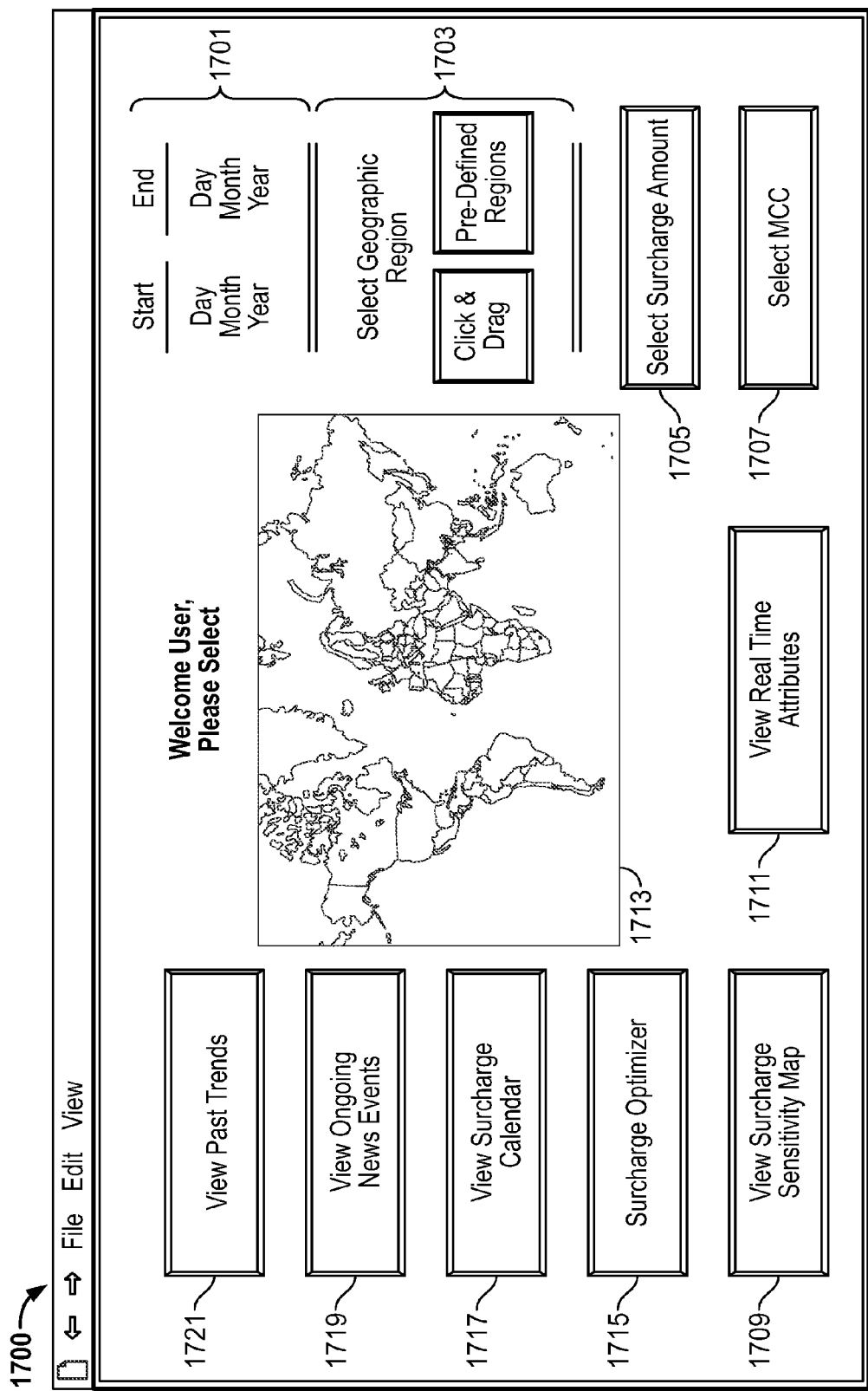
FIG. 17 shows an illustrative graphical user interface in accordance with the principles of the invention.

FIG. 17 shows illustrative graphical user interface ("GUI") 1700. GUI 1700 may include time selectors 1701. Time selectors 1701 may allow a user of GUI 1700 to select a start time and an end time. The start time may "turn on" a surcharge. The surcharge may include applying a surcharge fraction to a purchase amount. The surcharge may include adding a fixed amount to a purchase amount. The end time may "turn off" or alter the surcharge. GUI 1700 may allow the user to enter a plurality of start and end times.

GUI 1700 may include geographic selectors 1703. Geographic selectors 1703 may allow the user to select a geographic region where the surcharge may be turned on or off in accordance with the start and end times. GUI 1700 may allow the user to utilize geographic selectors 1703 and time selectors 1701 independently or in any suitable combination.

Geographic selectors 1703 may include a "click and drag" option. The click and drag option may allow a user to select a geographic region displayed on map 1713 using an input device or mechanism. The input mechanism may include a touch screen.

Geographic selectors 1703 may include a "pre-defined regions" option. A pre-defined region may include one or more geographic regions defined by a transaction participant, a system or any suitable party. The pre-defined regions may be associated with a surcharge schedule determined by the transaction participant, system or any suitable party.

GUI 1700 may include surcharge selector 1705. Surcharge selector 1705 may allow the user to enter a surcharge. The surcharge may be entered as an amount of currency, as a surcharge fraction, as a percentage of a purchase price or in any suitable form.

GUI 1700 may include MCC selector 1707. MCC selector 1707 may allow the user to select an MCC. The selected MCC may be utilized to impose the surcharge on a specific MCC. The selected MCC may be utilized to exclude the specific MCC from the surcharge.

The start time, the end time, the geographic region, the surcharge and the MCC may correspond to a surcharge schedule. The schedule may impose a recovery amount corresponding to the surcharge in the selected geographic region, at merchants associated with the selected MCC and during a time period defined by the start and end times. The user may create a surcharge schedule using some or all of the exemplary selectors available via GUI 1700.

GUI 1700 may allow the user to view a surcharge sensitivity map. The surcharge sensitivity map may include one or more features of map 1500 (shown in FIG. 15). The user may view the surcharge sensitivity map for a geographic region selected by selector 1703. GUI 1700 may allow the user to view surcharge sensitivity for a selected date/time, a selected region or selected surcharge.

GUI 1700 may include surcharge optimizer 1715. Surcharge optimizer 1715 may identify an optimal surcharge. The optimal surcharge may be identified for a geographic selection, a temporal selection, a MCC selection, any suitable selection entered by the user or any combination of selections entered by the user. The optimal surcharge may be determined based on a transaction attributes and/or performance metrics.

GUI 1700 may allow the user to view the surcharge schedule by selecting option 1715. The surcharge schedule may be displayed to the user in a calendar form. For example, the user may select a calendar day to view the "turn on" or "turn off" times associated with the calendar day. The location where the surcharge will be applied on the calendar day may be displayed on map 1713.

GUI 1700 may allow the user to view ongoing news events by selecting option 1719. Ongoing news events may be displayed for a selected geographic region on map 1713. Each news event may be represented by a marker on map 1713. The user may select a displayed marker and associate the event with a surcharge. The user may further limit application of the surcharge based on a start or end time, surcharge sensitivity at the location, a distance from the source of the news event or any suitable transaction attribute.

GUI 1700 may allow the user to view past trends by selecting option 1721. The past trends may include plotting a performance metric versus the surcharge applied to selected geographic region, period of time, MCC or any suitable combination of transaction attributes and performance metrics.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for recovering a transaction cost in connection with a transaction have been provided. Persons skilled in the art will appreciate that the present invention can be practiced by other than the described embodiments, which are presented for purposes of illustration rather than of limitation. The present invention is limited only by the claims that follow.

What is claimed is:

1. An article of manufacture comprising a non-transitory computer usable medium having computer readable program code embodied therein, the computer readable program code when executed by a processor on a computer system, performs a method for recovering an interchange fee associated with a credit card payment made by a customer using a payment instrument, the interchange fee imposed on a merchant that accepts the credit card payment from the customer, the method comprising:
 associating a geographic value with the credit card payment; determining whether the geographic value satisfies a geographic criterion;
 if the geographic value satisfies the geographic criterion:
  determining a surcharge amount to be charged by the merchant to the customer, for the payment instrument, based on at least:
   a sensitivity which indicates how the surcharge amount positively or negatively affects overall sales associated with the geographic criterion;
   a net cost of the interchange fee imposed on the merchant being reduced by a pre-determined percentage when the surcharge amount is collected by the merchant; and
   a net profit of the merchant being maintained above a pre-determined amount with respect to a plurality of credit card payments accepted by the merchant within the geographic criterion when the surcharge amount is collected by the merchant; and
  transmitting an authorization request to charge a first amount to an account of the customer associated with the payment instrument, the first amount not less than a sum of a price and the surcharge amount;
 if the geographic value does not satisfy the geographic criterion, transmitting an authorization request to charge the account of the customer a second amount not less than the price.

2. The article of claim 1, wherein in the method, the geographic value is based on a billing address associated with the payment instrument.

3. The article of claim 1, wherein in the method, the geographic criterion comprises a region.

4. The article of claim 3, wherein in the method, the region corresponds to a state.

5. The article of claim 3, wherein in the method, the region corresponds to a county.

6. The article of claim 3, wherein in the method, the region corresponds to a municipality.

7. The article of claim 3, wherein in the method, the region corresponds to an area defined by a zip code.

8. The article of claim 1, wherein in the method, the geographic criterion comprises a roadway.

9. The article of claim 1, wherein in the method, the geographic criterion comprises an address.

10. The article of claim 9, wherein in the method, the geographic criterion comprises a radius extending away from the address.

11. The article of claim 1, wherein in the method, the geographic criterion comprises a map coordinate.

12. The article of claim 11, wherein in the method, the map coordinate is one of a plurality of map coordinates defining a region.

13. The article of claim 12, wherein in the method, the map coordinates are received from a graphical user interface.

14. The article of claim 1, wherein in the method, the surcharge amount is also determined based on a channel of commerce associated with the interchange fee.

\* \* \* \* \*